(12) United States Patent
McNabb

(10) Patent No.: US 9,582,924 B2
(45) Date of Patent: Feb. 28, 2017

(54) FACILITATING DYNAMIC REAL-TIME VOLUMETRIC RENDERING IN GRAPHICS IMAGES ON COMPUTING DEVICES

(71) Applicant: INTEL CORPORATION, Santa Clara, CA (US)

(72) Inventor: Douglas Wayne McNabb, Bellevue, WA (US)

(73) Assignee: Intel Corporation, Santa Clara, CA (US)

(*) Notice: Subject to any disclaimer, the term of this patent is extended or adjusted under 35 U.S.C. 154(b) by 57 days.

(21) Appl. No.: 14/574,681

(22) Filed: Dec. 18, 2014

(65) Prior Publication Data

US 2016/0042552 A1  Feb. 11, 2016

Related U.S. Application Data

(60) Provisional application No. 62/036,065, filed on Aug. 11, 2014.

(51) Int. Cl.
*G06T 15/08* (2011.01)
*G06T 15/00* (2011.01)

(52) U.S. Cl.
CPC .............. *G06T 15/08* (2013.01); *G06T 15/005* (2013.01)

(58) Field of Classification Search
CPC ...... G06T 2200/04; G06T 13/20; G06T 15/08; G06T 17/00; G06T 2210/24; G06T 15/00; G06T 19/00; G06T 7/20; G06T 2207/20016; G06T 17/10; G06T 1/00;G06T 7/0071; G06T 13/60; G06T 13/80; G06T 2210/56; G06T 17/20; G06T 2207/30104; G06T 7/0087; G06T 15/405; G06T 15/40; G06T 15/005; G06T 15/60; G06T 15/06; G06F 17/5009; G06F 2217/16; G06F 17/5018
See application file for complete search history.

(56) References Cited

U.S. PATENT DOCUMENTS

2009/0040220 A1* 2/2009 Gibbs ................. G06T 13/60
345/424
2012/0330628 A1* 12/2012 McDaniel ........... G06F 17/5018
703/2

* cited by examiner

*Primary Examiner* — Haixia Du
(74) *Attorney, Agent, or Firm* — Blakely, Sokoloff, Taylor & Zafman LLP

(57) ABSTRACT

A mechanism is described for facilitating dynamic real-time volumetric rendering of graphics images on computing devices. A method of embodiments, as described herein, includes dividing a volume of a first image into a first volume and a second volume, where the first volume is associated with a fuzzy portion of the image, and the second volume is associated with a non-fuzzy portion of the image. The first volume may contain an array of metavoxels, where a metavoxel having an array of voxels. The method may further include applying particles to each metavoxel to detect a first set of voxels found inside one or more particles, and a second set of voxels found outside the particles, and generating, based on the first set of voxels, a second image from the first image. The method may further include to rendering the second image.

21 Claims, 19 Drawing Sheets

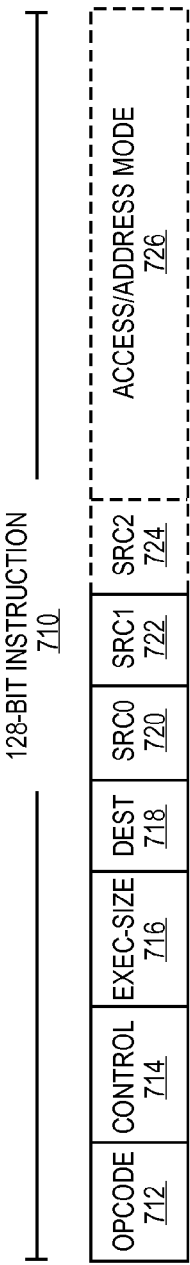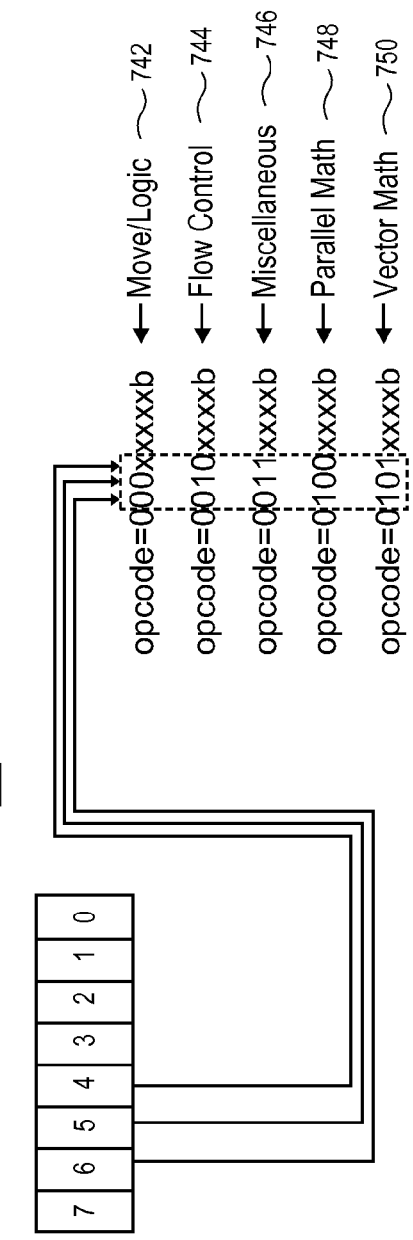
FIG. 7

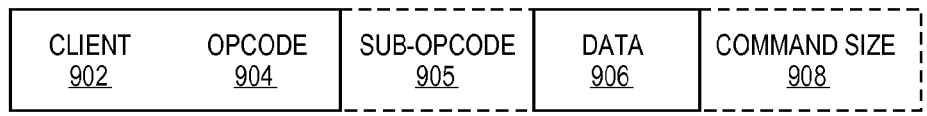
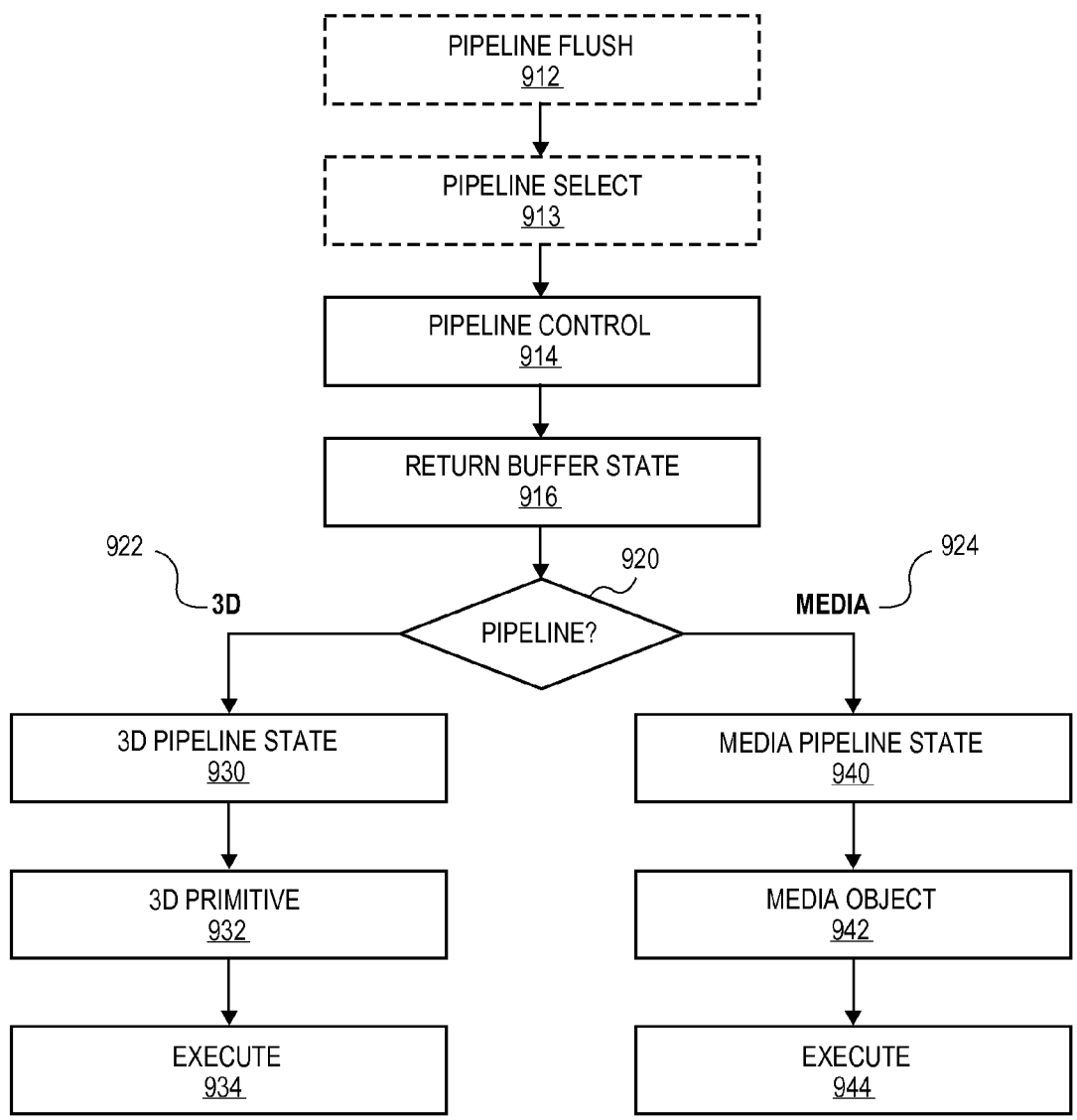

FACILITATING DYNAMIC REAL-TIME VOLUMETRIC RENDERING IN GRAPHICS IMAGES ON COMPUTING DEVICES

CLAIM OF PRIORITY

This application claims the benefit of and priority to U.S. Provisional Patent Application No. 62/036,065, by Douglas Wayne McNabb, filed Aug. 11, 2014, the contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Embodiments described herein generally relate to computers. More particularly, embodiments relate to a mechanism for facilitating dynamic real-time volumetric rendering in graphics images on computing devices.

BACKGROUND

Graphics processing units (GPUs) are optimized for triangle rendering and not well-suited for rendering of volumetric effects. Certain conventional techniques provide for filling of volume using a fluid dynamics simulation where the entire volume has to be processed, which limits such techniques to only those volumes that can be affordably stored and processed. These conventional simulation techniques are different from directly-authored effects and lack in direct artistic control that is valued by artists and designers.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor execution unit instruction format according to an embodiment.

FIG. 9A is a block diagram illustrating a graphics processor command format according to an embodiment and FIG. 9B is a block diagram illustrating a graphics processor command sequence according to an embodiment.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a scalable high-performance rendering of volumetric effects in graphics images on any type and size of computing devices and their GPUs, such as ranging from low-power graphics processors to high-end graphics processors.

Embodiments provide for a real-time volume rendering of graphics images, including video streams, etc., as facilitated by GPUs on computing devices (e.g., server computers, client computers, such as desktop computers, laptop computers, portable or mobile computing devices, such as smartphone, tablet computers, etc.). In one embodiment, the volume of the image may be filled with procedural data such that merely one or more portions of the volume that contain meaningful data may be processed and rendered while the other unimportant portions may be discarded without compromising any of the consequential or important contents of the image. As will be further described in this document, this technique prevents wasteful use of resources in terms of memory, power, and time, etc. It contemplated that terms like "volume rendering", "rendering of volume", "volumetric rendering", and "rendering of volumetric effects" may be used interchangeably throughout this document.

Figure 1:
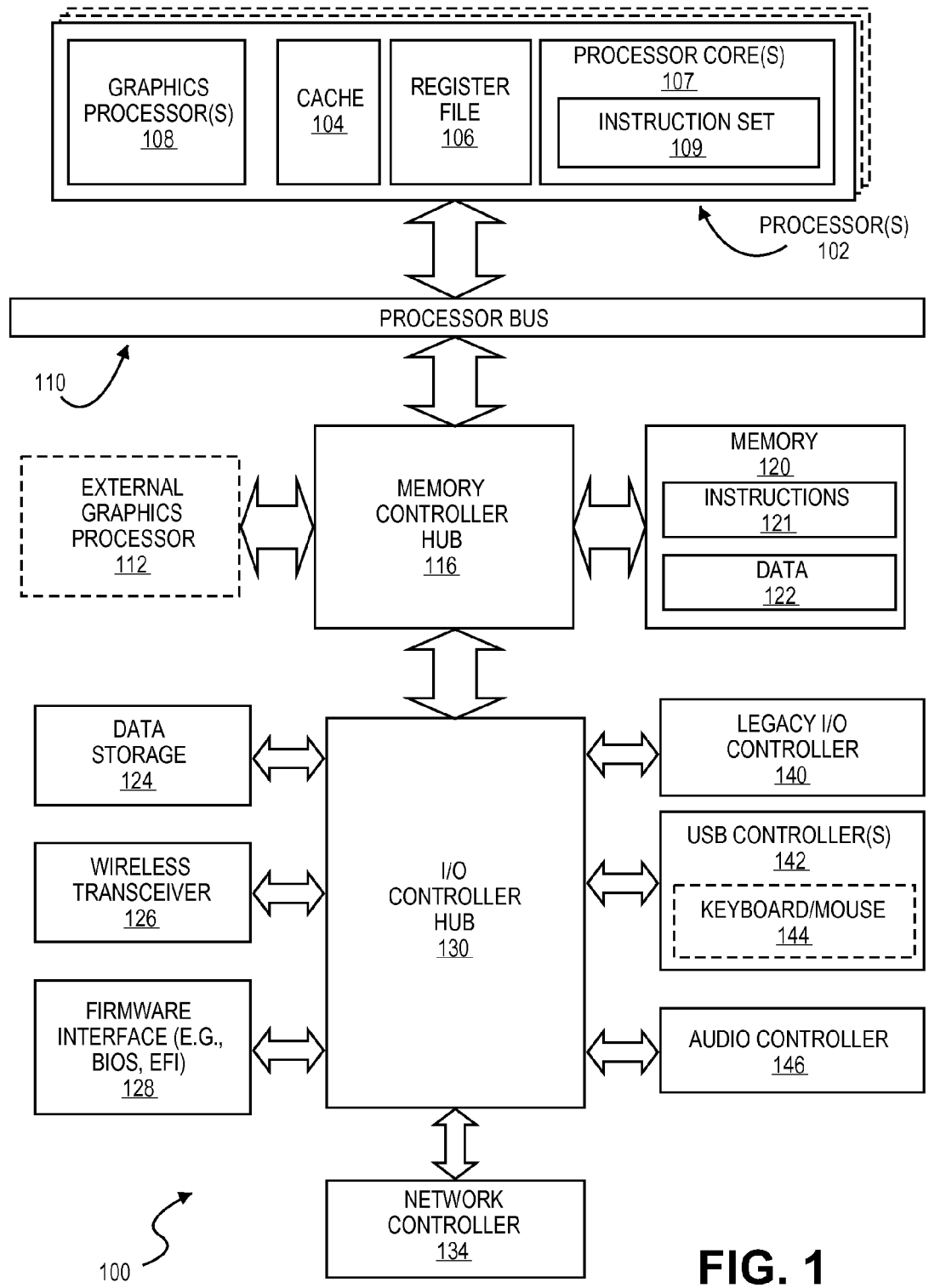
FIG. 1 is a block diagram of a data processing system, according to an embodiment.
Figure 2:
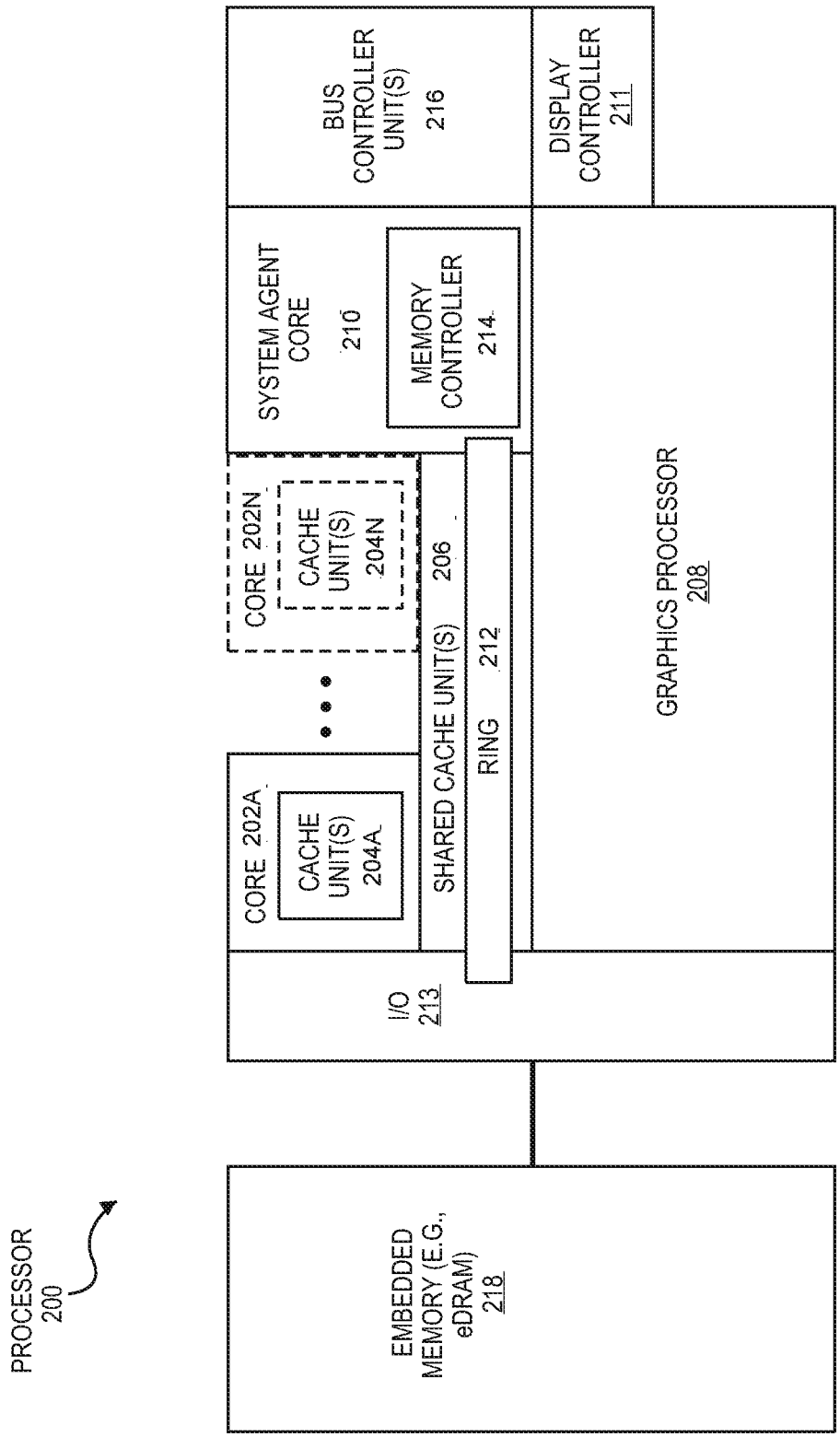
FIG. 2 is a block diagram of an embodiment of a processor having one or more processor cores, an integrated memory controller, and an integrated graphics processor.
Figure 3:
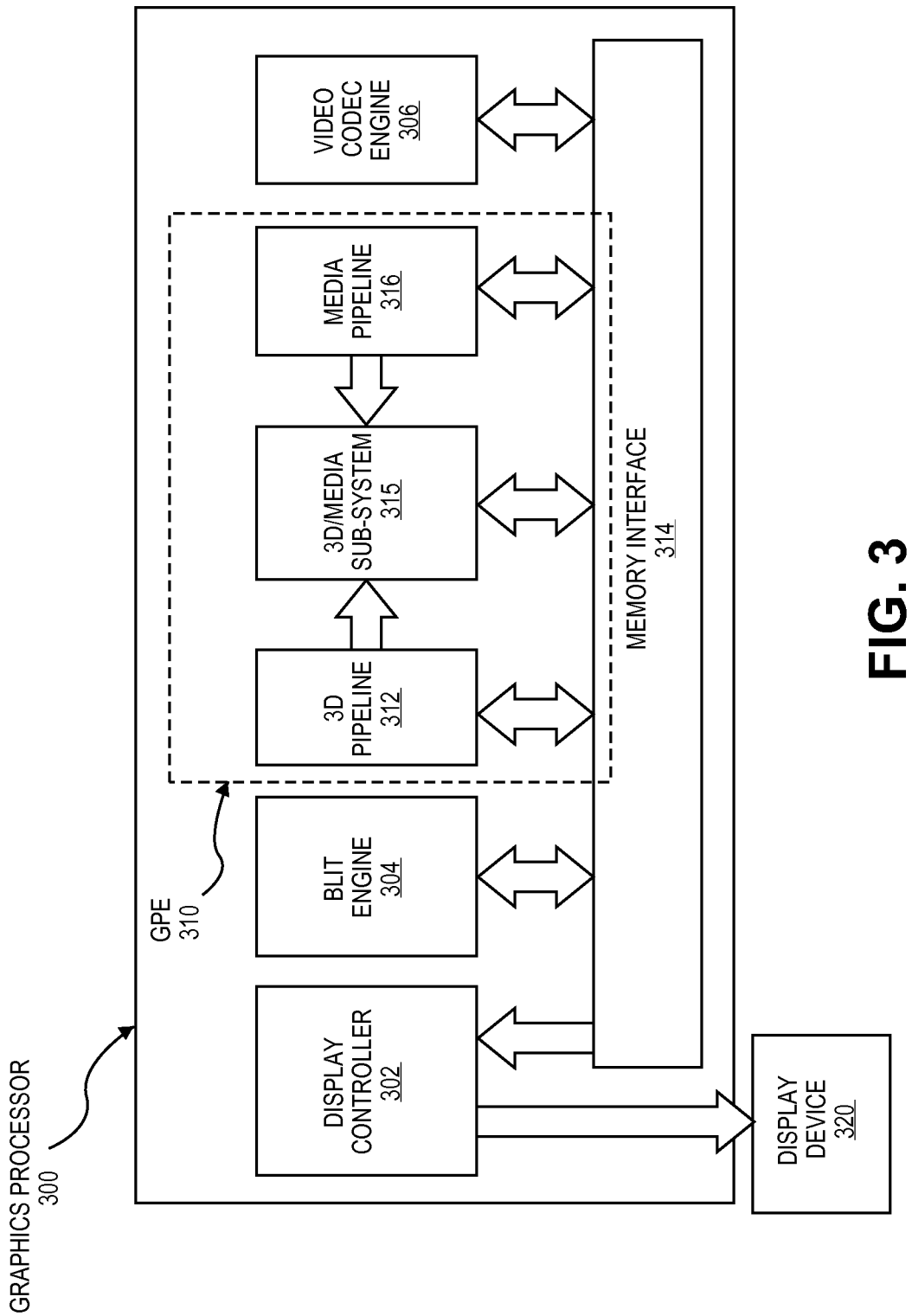
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache unit(s) 204A-N. In one embodiment each core also has access to one or more shared cached unit(s) 206.

The internal cache unit(s) 204A-N and shared cache unit(s) 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 2202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
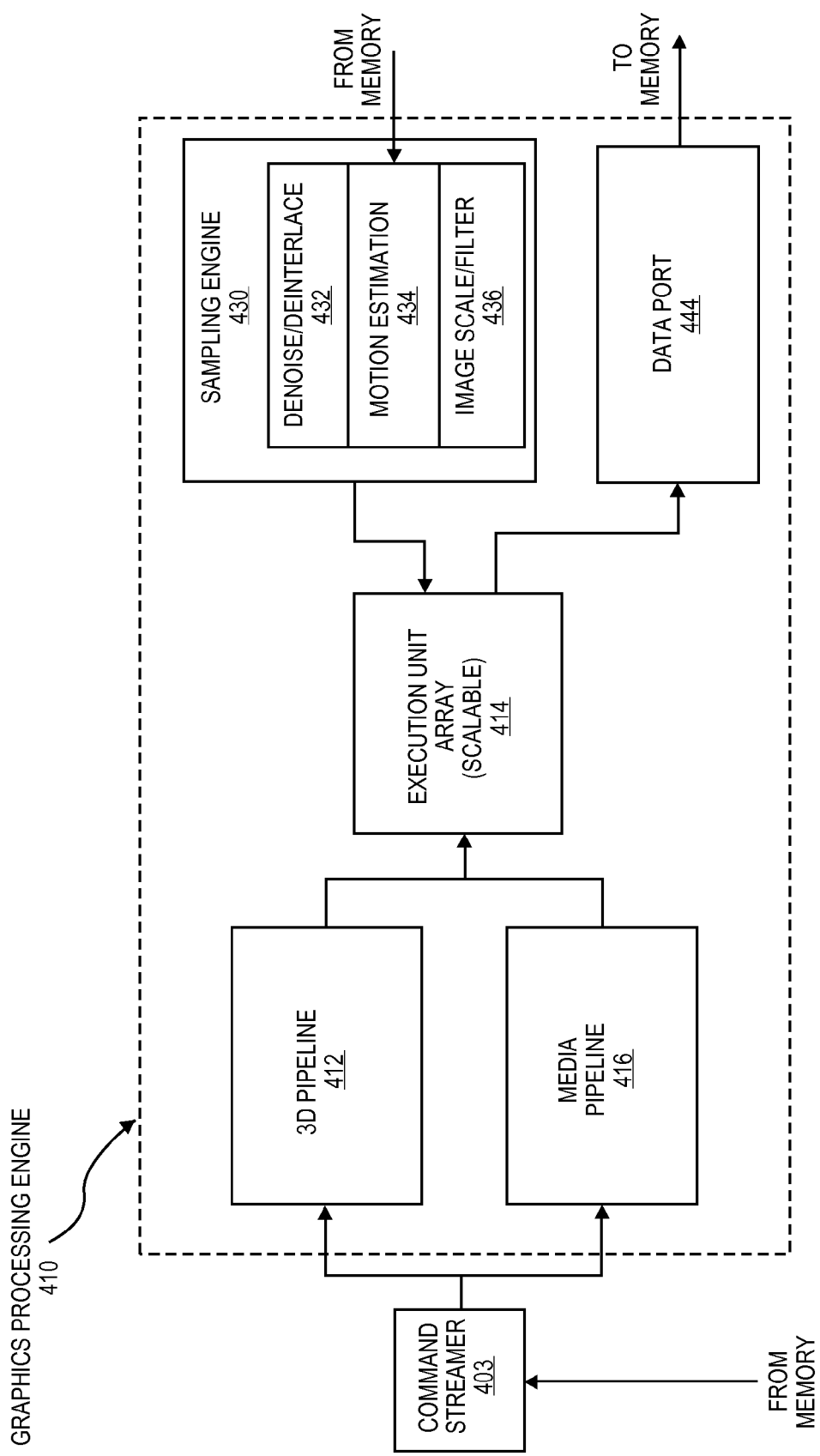
FIG. 4 is a block diagram of an embodiment of a graphics processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
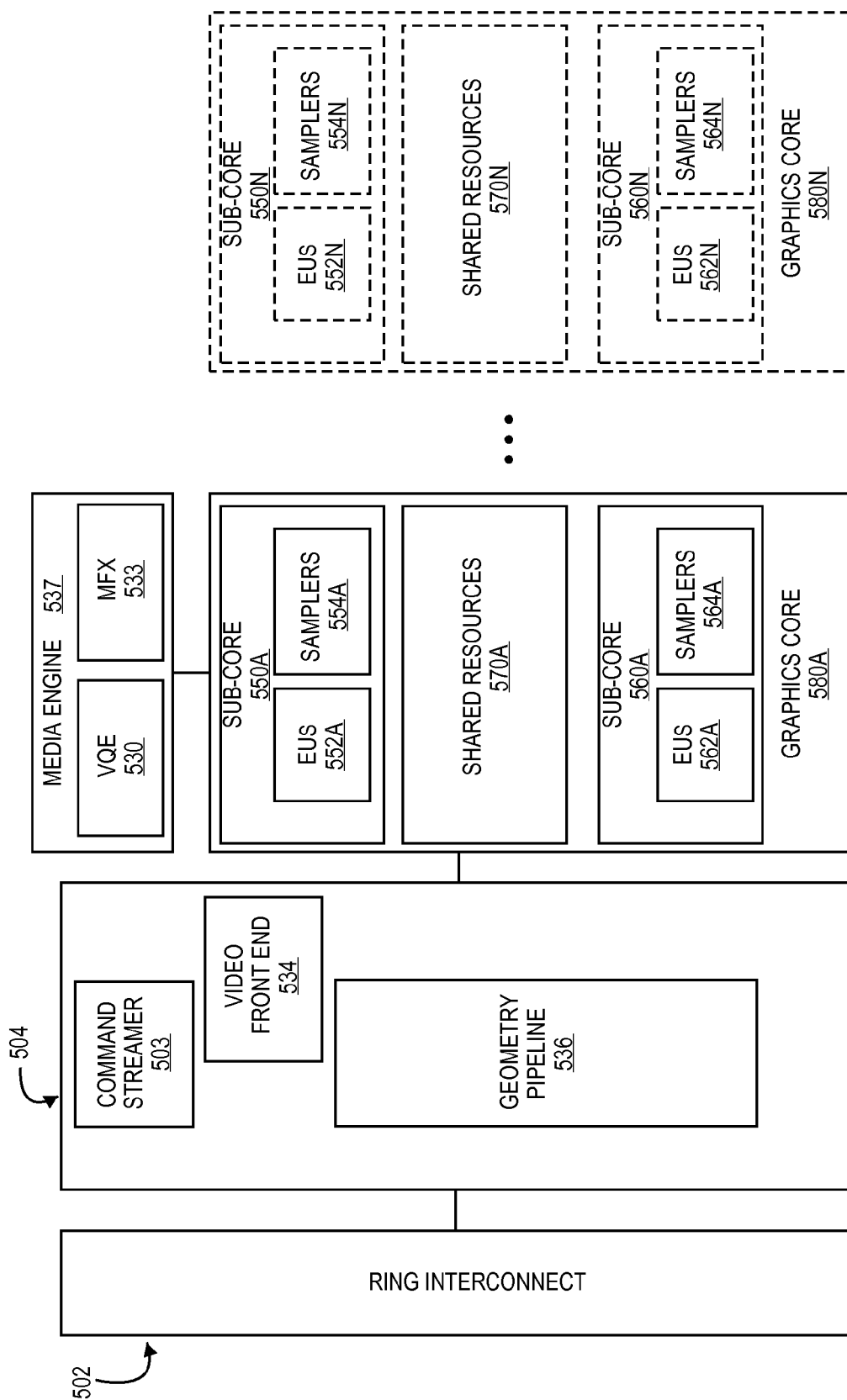
FIG. 5 is a block diagram of another embodiment of a graphics processor.
Figure 6:
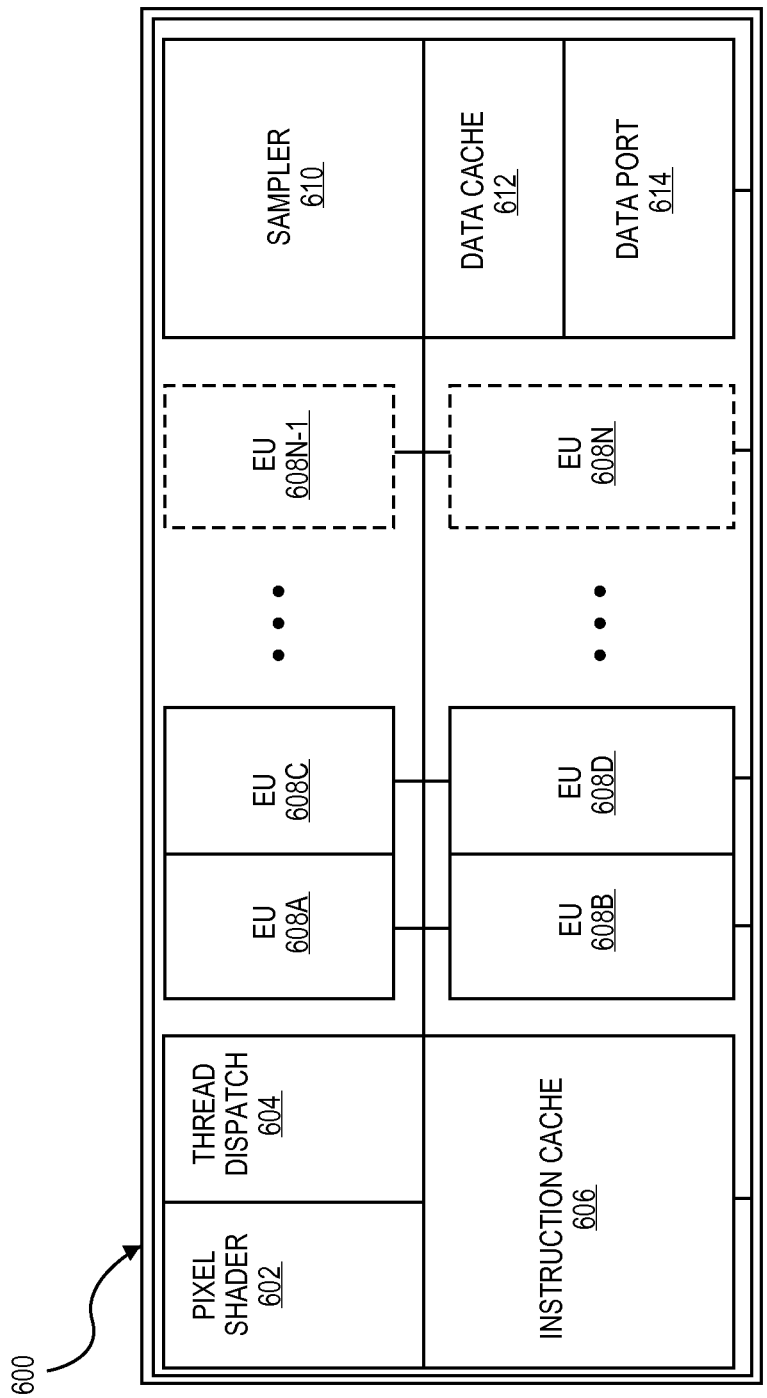
FIG. 6 illustrates thread execution logic including an array of processing elements employed in one embodiment of a graphics processing engine.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01).

A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
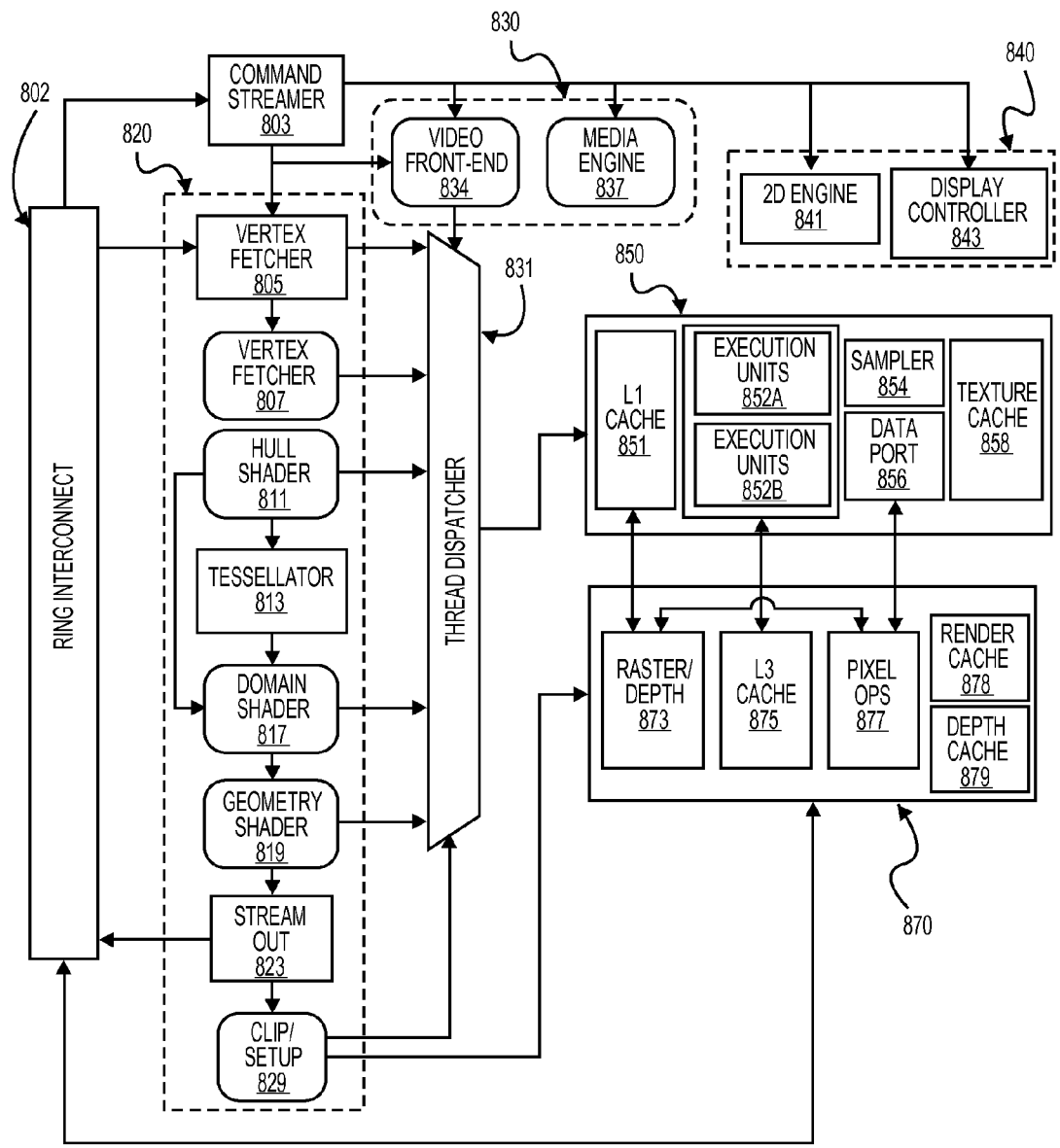
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL™) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command 27I execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
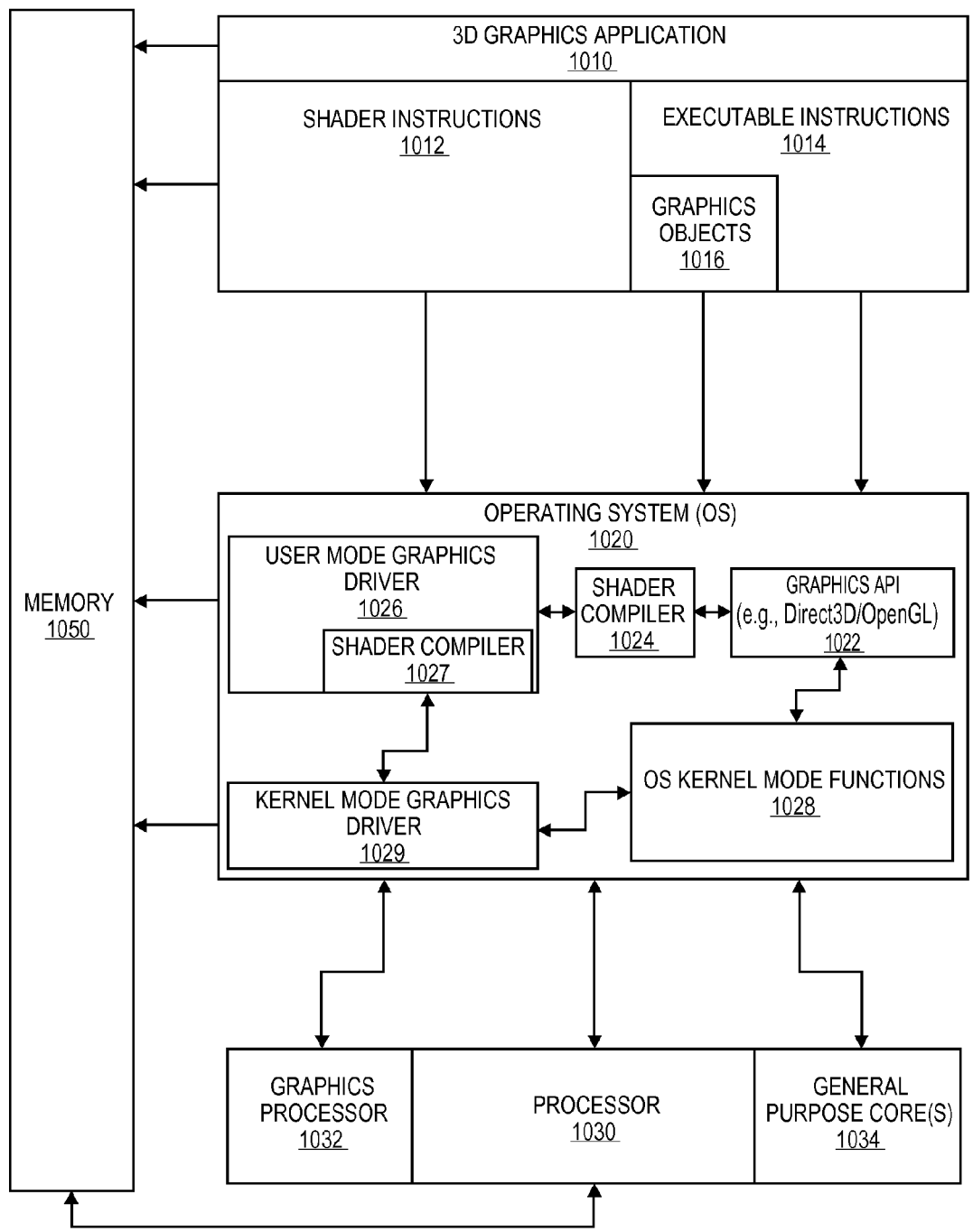
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Figure 11:
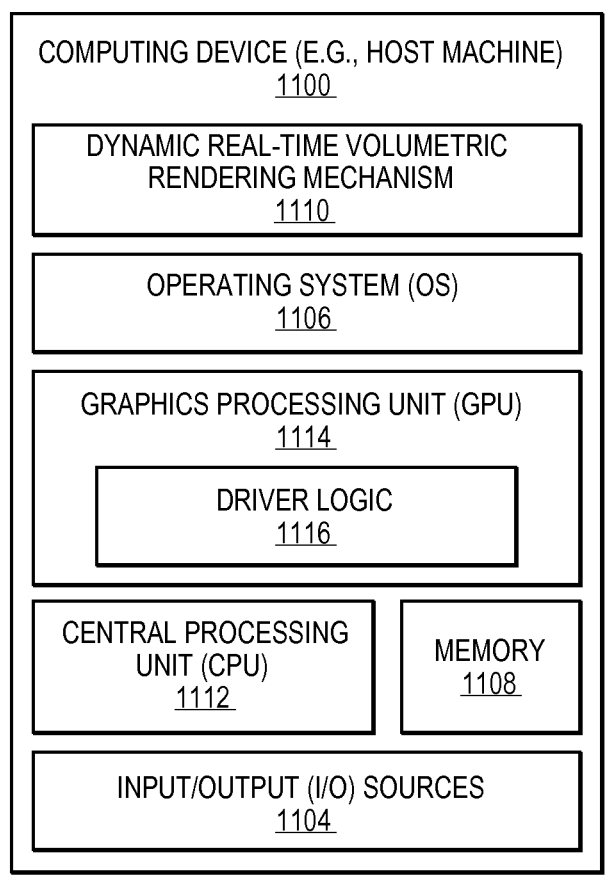
FIG. 11 illustrates a computing device employing a dynamic real-time volumetric rendering mechanism according to one embodiment.

FIG. 11 illustrates a computing device 1100 employing a dynamic real-time volumetric rendering mechanism 1110 according to one embodiment. Computing device 1100 (e.g., mobile computing device, desktop computer, etc.) may be the same as data processing system 100 of FIG. 1 and accordingly, for brevity and ease of understanding, many of the details stated above with reference to FIGS. 1-10 are not further discussed or repeated hereafter. Computing device 1100 may serve as a host machine for hosting dynamic real-time volumetric rendering mechanism ("volumetric mechanism") 1110 for facilitating dynamic volumetric rendering in graphics images that may include any number and type of components to perform various tasks to facilitate resource-efficient/cost-efficient procedural system-based processing of image volume as will be further described throughout this document. In one embodiment, volumetric mechanism 1110 may include any number and type of components to perform various tasks to facilitate efficient GPU-based real-time volume rending of images, as will be further described throughout this document. It is to be noted that throughout this document, terms like "graphics domain" may be referenced interchangeably with "graphics processing unit" or simply "GPU" and similarly, "CPU domain" or "host domain" may be referenced interchangeably with "computer processing unit" or simply "CPU".

Computing device 1100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1100 may include mobile computing devices serving as communication devices, such as cellular phones including smartphones, personal digital assistants (PDAs), tablet computers, laptop computers, e-readers, smart televisions, television platforms, smart windows, head-mounted displays (HMDs) and other wearable devices (e.g., wearable glasses, watches, bracelets, smartcards, jewelry, clothing items, etc.), media players, etc. For example, in one embodiment, computing device 1100 may include a mobile computing device employing an integrated circuit ("IC"), such as system on a chip ("SoC" or "SOC"), integrating various hardware and/or software components of computing device 1100 on a single chip.

As illustrated, in one embodiment, in addition to employing volumetric mechanism 1110, computing device 1100 may further include any number and type of hardware components and/or software components, such as (but not limited to) CPU 1112, GPU 1114 having graphics driver logic 1116, memory 1108, network devices, drivers, or the like, as well as input/output (I/O) sources 1104, such as touchscreens, touch panels, touch pads, virtual or regular keyboards, virtual or regular mice, ports, connectors, etc. In one embodiment, volumetric mechanism 1110 may be hosted by driver logic 1116 of GPU 1114. In another embodiment and as illustrated, volumetric mechanism 1110 may not be hosted by driver logic 1116 and that it may be hosted independently and elsewhere at computing device 100 while staying in communication with other components of computing device 100, such as operation system 1106, CPU 1112, driver logic 1116 and other components of GPU 1114, etc.

Computing device 1100 may include operating system (OS) 1106 serving as an interface between hardware and/or physical resources of the computer device 1100 and a user. It is contemplated that CPU 1112 may include one or more processors, such as processor(s) 102 of FIG. 1, while GPU 1114 may include one or more graphics processors, such as graphics processor(s) 108 of FIG. 1. In one embodiment and as will be further described with reference to the subsequent figures, volumetric mechanism 1110 may be in communication with driver logic 1116 which cooperates with GPU 1114 to facilitate any number and type of tasks facilitating real-time rendering of volume for graphics images as is described through this document.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-10, some processes of the graphics pipeline as described above are implemented in software, while the rest are implemented in hardware. A graphics pipeline may be implemented in a graphics coprocessor design, where CPU 1112 is designed to work with GPU 1114 which may be included in or co-located with CPU 1112. In one embodiment, GPU 1114 may employ any number and type of conventional software and hardware logic to perform the conventional functions relating to graphics rendering as well as novel software and hardware logic to execute any number and type of instructions, such as instructions 121 of FIG. 1, to perform the various novel functions of volumetric mechanism 1110 as disclosed throughout this document.

As aforementioned, memory 1108 may include a random access memory (RAM) comprising application database having object information. A memory controller hub, such as memory controller hub 116 of FIG. 1, may access data in the RAM and forward it to GPU 1114 for graphics pipeline processing. RAM may include double data rate RAM (DDR RAM), extended data output RAM (EDO RAM), etc. CPU 1112 interacts with a hardware graphics pipeline, as illustrated with reference to FIG. 3, to share graphics pipelining functionality. Processed data is stored in a buffer in the hardware graphics pipeline, and state information is stored in memory 1108. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1108 may comprise a pre-allocated region of a buffer (e.g., frame buffer); however, it should be understood by one of ordinary skill in the art that the embodiments are not so limited, and that any memory accessible to the lower graphics pipeline may be used. Computing device 1100 may further include input/output (I/O) control hub (ICH) 130 as referenced in FIG. 1, one or more I/O devices, etc.

CPU 1112 may include one or more processors to execute instructions in order to perform whatever software routines the computing system implements. The instructions frequently involve some sort of operation performed upon data. Both data and instructions may be stored in system memory 1108 and any associated cache. Cache is typically designed to have shorter latency times than system memory 1108; for example, cache might be integrated onto the same silicon chip(s) as the processor(s) and/or constructed with faster static RAM (SRAM) cells whilst the system memory 1108 might be constructed with slower dynamic RAM (DRAM) cells. By tending to store more frequently used instructions and data in the cache as opposed to the system memory 1108, the overall performance efficiency of computing device 1100 improves. It is contemplated that in some embodiments, GPU 1114 may exist as part of CPU 1112 (such as part of a physical CPU package) in which case, memory 1108 may be shared by CPU 1112 and GPU 1114 or kept separated.

System memory 1108 may be made available to other components within the computing device 1100. For example, any data (e.g., input graphics data) received from various interfaces to the computing device 1100 (e.g., keyboard and mouse, printer port, Local Area Network (LAN) port, modem port, etc.) or retrieved from an internal storage element of the computer device 1100 (e.g., hard disk drive) are often temporarily queued into system memory 1108 prior to their being operated upon by the one or more processor(s) in the implementation of a software program. Similarly, data that a software program determines should be sent from the computing device 1100 to an outside entity through one of the computing system interfaces, or stored into an internal storage element, is often temporarily queued in system memory 1108 prior to its being transmitted or stored.

Further, for example, an ICH, such as ICH 130 of FIG. 1, may be used for ensuring that such data is properly passed between the system memory 1108 and its appropriate corresponding computing system interface (and internal storage device if the computing system is so designed) and may have bi-directional point-to-point links between itself and the observed I/O devices. Similarly, an MCH, such as MCH 116 of FIG. 1, may be used for managing the various contending requests for system memory 1108 accesses amongst CPU 1112 and GPU 1114, interfaces and internal storage elements that may proximately arise in time with respect to one another.

I/O sources 1104 may include one or more I/O devices that are implemented for transferring data to and/or from computing device 1100 (e.g., a networking adapter); or, for a large scale non-volatile storage within computing device 1100 (e.g., hard disk drive). User input device, including alphanumeric and other keys, may be used to communicate information and command selections to GPU 1114. Another type of user input device is cursor control, such as a mouse, a trackball, a touchscreen, a touchpad, or cursor direction keys to communicate direction information and command selections to GPU 1114 and to control cursor movement on the display device. Camera and microphone arrays of computer device 1100 may be employed to observe gestures, record audio and video and to receive and transmit visual and audio commands.

Computing device 1100 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1100 may vary from implementation to implementation depending upon numerous factors, such as price constraints, performance requirements, technological improvements, or other circumstances. Examples of the electronic device or computer system 1100 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 12:
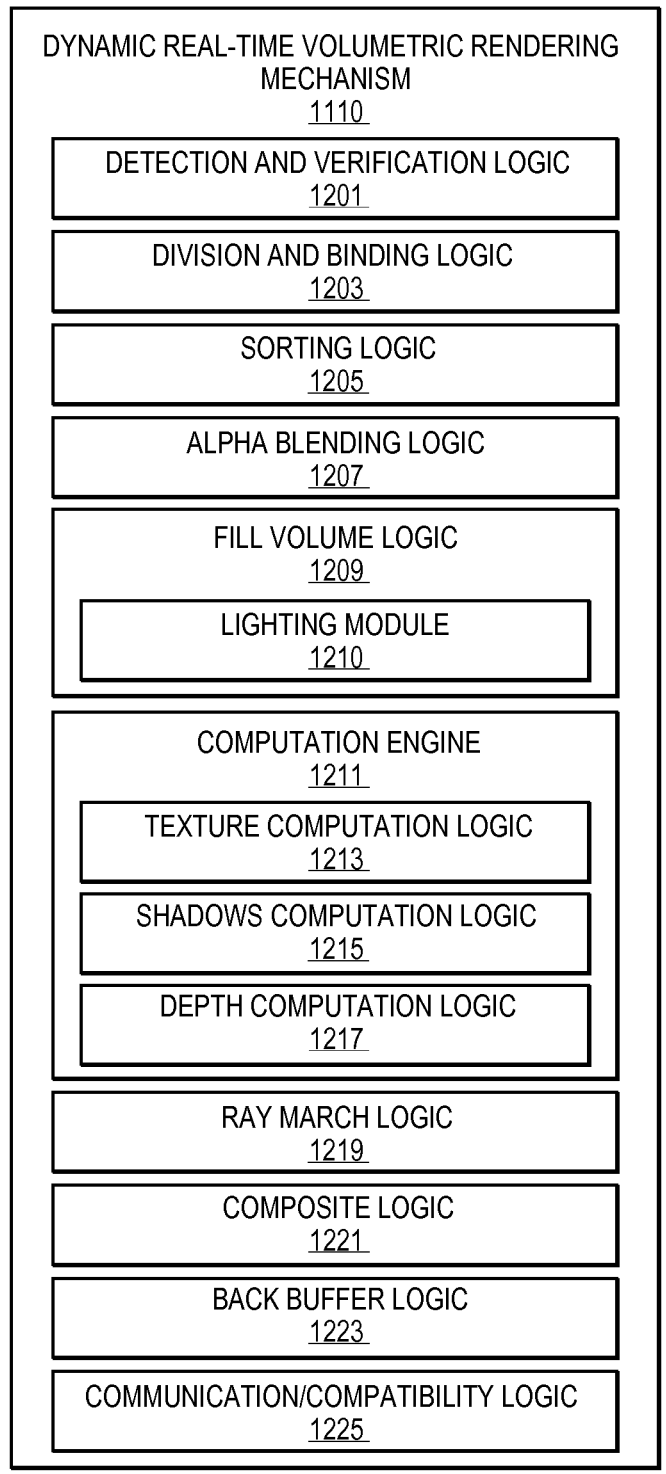
FIG. 12 illustrates a dynamic real-time volumetric rendering mechanism according to one embodiment.

FIG. 12 illustrates a dynamic real-time volumetric rendering mechanism 1110 according to one embodiment. In one embodiment, volumetric mechanism 1110 may include any number and type of components to perform various tasks relating to facilitating dynamic and efficient real-time rendering of volumetric effect of graphics images at computing devices, such as computing device 1100 of FIG. 11. For example and in one embodiment, volumetric mechanism 1110 may include (but not limited to): detection and verification logic 1201; division and binning logic 1203; sorting logic 1205; alpha blending logic 1207; fill volume logic 1209 including lighting module 1210; computation engine 1211 including texture computation logic 1213, shadows computation logic 1215, and depth computation logic 1217; ray march logic 1219; composite logic 1221; back buffer logic 1223; and communication/compatibility logic 1225. It is further illustrated and as aforementioned with reference to FIG. 11, volumetric mechanism 1110 may be in communication with CPU, and/or GPU such that one or more tasks may be performed in communication with the CPU and/or GPU, such as CPU 1112 and GPU 1114 of computing device 1100 of FIG. 11.

It is contemplated that a graphics image may contain portions that may be regarded as solid or defined, such as a train with its exact measurements, along with other portions that are regarded as fuzzy or undefined, such as the smoke coming out of the train. It is therefore contemplated that not the entire volume of an undefined portion of the image may be rendered due to its content being relatively meaningless. However, with conventional techniques, all portions of images with their full volume are rendered, resulting in a waste of system resources, such as time, memory, and power. It is further contemplated that embodiments are not merely limited to undefined or fuzzy portions (e.g., cloud) of the image, but that they are also applicable to defined non-fuzzy portions (e.g., solid structure) of the image; however, for the sake of brevity, clarity, and ease of understanding, the undefined/fuzzy portions are the focus of the discussion throughout this document. For example, in one embodiment, volumetric mechanism 1110 may be applied to smoke 1303 (e.g., undefined/fuzzy portion) of image 1300 of FIG. 13A as is described throughout this document; however, embodiments are not limited as such and may be equally applied to train 1301 (e.g., defined/non-fuzzy portion) of image 1300 of FIG. 13A.

Similarly, embodiments are not limited to being executed on a CPU or a GPU, such as CPU 1112, GPU 1114 of FIG. 11; for example and in one embodiment, volumetric mechanism 1110 may be executed on a CPU without requiring a GPU and vice versa. Further, for example, volumetric mechanism 1110 may remain in communication with various CPU/GPU components and may even be hosted by one or more such components, such as driver logic 1116 of GPU 1114 of FIG. 11.

In one embodiment, volumetric mechanism 1110 provide a sparse procedural system-based processing for facilitating intelligently-controlled processing of volumetric effects of graphics images in real-time and runtime, where any extent of an image or a portion of an image that is regarded meaningless may be identified and not process in order to avoid or significantly reduce inefficiencies and costs relating image rendering as facilitated by GPUs.

For example, in gaming systems, approximating volumetric effects may be considered easier with regard to two-dimensional (2D) game systems as opposed to three-dimensional (3D) game systems as full 3D games systems are not regarded as fast enough to accomplish volumetric effects. Embodiments provide for a novel and innovative procedural system that facilitates performance and qualities that are suitable for use in all types of games, such as 2D and 3D gaming systems.

For example, in some embodiments, a simplified set of processes as facilitated by volumetric mechanism 1110 may be performed as follows (without limitation):

```
//Render shadow map
foreach scene model visible from light
    draw model from light view
//Render eye-view Z-Prepass
foreach scene model visible from eye
    draw model from eye view
//Bin particles
foreach particle
    foreach metavoxel covered by the panicle
        append particle to metavoxel's panicle list
//Draw metavoxels to eye-view render target
foreach non-empty metavoxel
    fill metavoxel with binned particles and shadow map as input
    ray march metavoxel from eye point of view, with depth buffer as
        input
//Render scene to back buffer
foreach scene model
    draw model from eye view
//Composite eye-view render target with back buffer
    draw full-screen sprite with eye-view render target as texture
```

For example, it is to be noted that in some embodiments, as listed above, filling multiple metavoxels, via fill volume logic 1209, may be performed prior to marching them via ray march logic 1219 of volumetric mechanism 1110. In one embodiment, fill volume engine 1209 may be used to fill a cache of metavoxels and then ray marching is performed which may then be iterated or repeated until all non-empty metavoxels (associated with occupied particles) are considered. Further, the metavoxels may be filled every $n^{th}$ frame, or filling them only once; however, if the real application needs a static or a slowly-changing volume, the filling process may be done significantly faster by not updating the metavoxels every frame.

In one embodiment, detection and verification logic 1201 may serve to perform any number and type of rejection and authentication purposes; for example, detection and verification logic 1201 may be used for detection of portions of images that may be regarded as fuzzy or undefined, such as cloud, smoke, etc., as well as the volumes associated with such portions which may then be divided into sub-volumes representing metavoxels. In one embodiment, division and binning logic 1203 may be used to divide the whole volume associated with an image into a first volume associated with a fuzzy portion of the volume and a second volume associated with a non-fuzzy portion of the volume. In one embodiment, division and binning logic 1203 may be further used to divide the volume, such as the first volume, into metavoxels (also referred to as "sub-volumes") or any array of metavoxels, where each metavoxel may include an array of voxels which are further processed and determined as to whether they be rendered in the final image or not.

For example, an image's undefined portion, such as a cloud, smoke, etc., may include any number of voxels or pixels which may not include any data of importance or meaning and therefore, in one embodiment, may not be processed or displayed in a final image expected to be viewed by the user. Such no-data or meaningless voxels or pixels may constitute a significant portion of the total volume that represents the undefined portion or, in some cases, the image. Accordingly, upon detection and verification of the undefined portion by detection and verification logic 1201, in one embodiment, division and binning logic 1203 may facilitate one or more techniques to logically divide a total volume of the undefined portion into an array of metavoxels, such as treating a 512×512×512 voxel volume as 16×16×16 metavoxels, where each 16×16×16 metavoxel contains 32×32×32 voxels, etc., which may be performed at the CPU side and subsequently communicated on to the GPU side to be further processed by volumetric mechanism 1110.

These metavoxels may be regarded as sub-portions or particles of the total volume and collected to be placed in any number of bins by division and binning logic 1203. In one embodiment, division and binning logic 1203 may place the collection of particles into bins such that each volume primitive particle may correspond to one or more metavoxel that is committed to a bin such that each bin occupies one metavoxel. Similarly, a metavoxel may be associated with one or more particles.

The aforementioned particles may correspond to the total volume of the portion of the image, where each metavoxel may include any number of voxels as is further illustrated with reference to FIG. 13B. For example, a particle may include a 3D particle that refers to a radially-displaced sphere volume primitive of the total volume, where the volume refers to the overall volume that is composed of an array of metavoxels. For example, each metavoxel may include an array of voxels, such as 3D voxels, where each voxel stores a color and density relating to the portion of the image. Further, each metavoxel may be stored as a 3D texture, such as $32^3$ DXGI_FORMAT_R16G16B16A16_FORMAT 3D TEXTURE, etc.

As aforementioned, in one embodiment, the sparse procedural volumetric rendering as facilitated by volumetric mechanism 1110 may be used to efficiently render a large volume by breaking it into smaller pieces and processing only the occupied pieces. These pieces may be referred to as metavoxels, where a metavoxels refers to an array of voxels and where a voxel may be the volume's smallest piece. As the volume being a 3D array of metavoxels, certain compile-time constants may be applied for processing, such as a total volume size of $1024^3$ voxels, in the form of $32^3$ metavoxels, each composed of $32^3$ voxels.

In one embodiment, upon having placed these particles in one or more bins, sorting of metavoxels may be performed as facilitated by sorting logic 1205 and further illustrated and described with reference to FIG. 13C. For example and in one embodiment, metavoxel rendering may honor a number of sort orders, such as two sort orders where one order may be for the light while the other sort order may be for the eye. Further, for example, light-propagation may start at the metavoxels closest to the light, and progresses through more distant metavoxels and given that metavoxels may be semi-transparent, to achieve correct results, a technique for sorting from the eye view may also be employed and used along with the technique of light-propagation. In other words, the two choices with regard to the sorting from the eye view may include: 1) back-to-front with over alpha blending; and/or 2) front-to-back with under alpha blending.

With regard to alpha blending, in one embodiment, upon sorting of the metavoxels using sorting logic 1205, alpha blending logic 1207 may be used to evaluate sorting samples obtained from the sorting process for alpha blending. For example, whether a sorting sample uses over-blending for the metavoxels that are sorted back-to-front (e.g., the most-distant metavoxel is rendered first, followed by successively closer metavoxels, etc.), or whether the sample uses under-blending for the metavoxels that are sorted front-to-back (e.g., the closest metavoxel is rendered first, with more-distant metavoxels rendered behind and thereafter).

In some embodiments, over-blending and under-blending metavoxels may be presented as follows: 1) Over-blend: $Color_{dest}=Color_{dest}*Alpha_{src}+Color_{src}$; and 2) Under-blend: $Color_{dest}=Color_{src}*Alpha_{dest}+Color_{dest}$. Similarly, for example, the sample may blend the alpha channel the same for both over-blending and under-blending as they both help scale the destination alpha by the pixel shader alpha, such as $Alpha_{dest}=Alpha_{dest}*Alpha_{src}$. For example, the following may be regarded as rendered states used for over-blending and under blending:

Over-Blend Rendered States (from EyeViewRayMarchOver.Rs)
SrcBlend=D3D11_BLEND_ONE
DestBlend=D3D11_BLEND_SRC_ALPHA
BlendOp=D3D11_BLEND_OP_ADD
SrcBlendAlpha=D3D11_BLEND_ZERO
DestBlendAlpha=D3D11_BLEND_SRC_ALPHA
BlendOpAlpha=D3D11_BLEND_OP_ADD Under-Blend Rendered States (from EyeViewRayMarchUnder.Rs)
SrcBlend=D3D11_BLEND_DEST_ALPHA
DestBlend=D3D11_BLEND_ONE
BlendOp=D3D11_BLEND_OP_ADD
SrcBlendAlpha=D3D11_BLEND_ZERO
DestBlendAlpha=D3D11_BLEND_SRC_ALPHA
BlendOpAlpha=D3D11_BLEND_OP_ADD In one embodiment, upon sorting of metavoxels, the relevant data (e.g., sorted data, formats, etc., relating to the metavoxels) may be forwarded onto fill volume engine 1209 for further processing. For example and in one embodiment, the sorted sample of metavoxels may achieve further efficiency by populating the volume with volume primitives as facilitated by fill volume logic 1209. It is contemplated that various different volume primitive types may be used, such as a radially-displaced sphere, and the sample may use a cube map to represent the displacement over the sphere's surface, where, in one embodiment, any metavoxels affected by the volume primitives are identified and their color and density are computed using one or more components computation engine 1211, and subsequently, the results are ray marched from the eye's point of view as facilitated by ray march logic 1219.

In some embodiments, the sample may fill the metavoxels with those particles that cover them, where covered refers to a particle's bounds intersecting with one or more metavoxel's bounds as is further illustrated with reference to FIG. 13B, where using this technique, the sample avoids processing empty metavoxels. For example, for each particle, which may spread over one or more metavoxels of the volume, a determination may be made as to which of the voxels are covered by a particle and which ones are not covered. In one embodiment, the voxels that are covered by the particle may be further processed and carried to be displayed in the final image, representing the fuzzy portion (such as smoke 1301 of FIG. 13A) of the image, while the uncovered voxels of the fuzzy portion of the image may be dropped without any additional processing.

It is contemplated that each bin may have or be associated with one metavoxel and, in one embodiment, fill volume logic 1209 may be used to review each metavoxel to determine one or more voxels that are covered by a particle and those voxels that are not so covered. This process is performed for each metavoxel, each voxel, and each particle of each metavoxel of the sample obtained from the total volume of the image, where fill volume logic 1209 may use a composite shader and/or a pixel shader to perform one or more tasks in communicating with the GPU and other components of volumetric mechanism 1110.

In one embodiment, fill volume logic 1209 may dispatch a pixel or compute shader to fill the volume texture, and a pixel shader to ray march and composite with the effect result texture. For example, fill volume logic 1209 may use any number and type of inputs/outputs to fill the volume so one or more metavoxels may be processed and dispatched for additional processing. For example, as illustrated with respect to FIG. 14, fill volume logic 1209 may performs its tasks based on inputs and/or two-way communication from one or more data sources providing any amount and type of data, such as lighting samples, 2D light-propagation textures 2D volume texture, shadow computation results, etc. Similarly, other data inputs, such as depth computation results, effect result texture, etc., may be used further down the process for better processing of a metavoxel representing the fuzzy portion of the image. This process may be repeated for each metavoxel contained in the sample of the total volume of the image.

In one embodiment, fill volume logic 1209 may further include a lighting module 1210 to implement a simple lighting model by lighting the voxels after the color and density has been computed for each of the voxels of each of the metavoxels of the volume sample. For example, a pixel shader along with a voxel column may be used to multiply each voxel's color using the current light value. It then attenuates the light value according to the voxel's density. The attenuation may be achieved via any number and type of manners, such as using a factor of $e^{-density}$ or $1/(1+density)$, etc., where both factors vary from 1 at 0 to 0 at infinity. The results may be the same for both factors, but using the factor of $1/(1+density)$, the divide may be faster than exp( ), such as $L_{n+1}=L_n/(1+density_n)$. It is to be noted that this loop propagates lighting through a single metavoxel, including propagating lighting from one metavoxel to the next via a light-propagation texture as facilitated by texture computation logic 1213, where the last light-propagation value is written to the texture. The next metavoxel may read its initial light-propagation value from the texture and this 2D texture may be sized for the entire volume, where sizing for the entire volume provides for allowing of processing multiple metavoxels in parallel and its final contents can be used as a light map for casting shadows from the volume onto the rest of the scene.

In one embodiment, computation engine 1211 is employed to be used for various computations to be used with other components of volumetric mechanism 1110, such as full volume logic 1209, ray march logic 1219, composite logic 1221, etc. For example and in one embodiment, 2D light-propagation texture computation and 3D volume texture computation may be determined by texture computation logic 1213 and the relevant data may be communicated in a bi-direction manner with full volume logic 1209 as illustrated in FIG. 14. Similarly, as further illustrated with reference to FIG. 14, for example, effect result texture may also be determined by texture computation logic 1213 and the relevant data may be communicated with ray march logic 1219 and composite logic 1221, etc. Further, shadows cast from the scene unto the volume and vice versa may be may be determined using shadows computation logic 1215 and any relevant data may be communicated with full volume logic 1209. Similarly, a depth test may be performed using depth using depth computation logic 1217 and any relevant data may be communicated with ray march logic 1219. It is contemplated that any of the aforementioned data may be stored and capable of being accessed at one or more databases, such as database 1230.

In one embodiment, texture computation logic 1213 may be used to compute various relevant textures, such as 2D light-propagation texture, 3D volume texture, effect result texture, etc., and/or, in another embodiment, texture computation logic 1213 may, using communication/compatibility logic 1225, establish access to the aforementioned textures being stored and maintained at database 1230. For example, 3D volume texture may be computed, via texture computation logic 1213, to mathematically obtain a 3D model of metavoxels of the volume sample, where this 3D volume model/texture may then be stored at database 1230 to be accessed by fill volume logic 1209 and/or ray march logic 1219. In one embodiment, a 3D volume texture may be regarded as the manifestation or embodiment of a metavoxel such that each element in the 3D volume texture may represent a voxel of the metavoxel.

In one embodiment 2D light-propagation texture may be used to communicate between metavoxels. For example, since fill volume logic 1209 process one metavoxel at a time, it references the available 2D light-propagation texture to determine the results of the already-processed metavoxel so it may begin processing the next metavoxel that is supposed to logically follow the already-processed metavoxel. Stated differently, 2D light-propagation texture sets up an assembly line of metavoxels for fill volume logic 1209 such that although one metavoxel at a time may be resident in the memory for processing, the next metavoxel in line is made to be ready to be called, without any delays, for processing once the processing of the resident metavoxel is over.

Further, with regard to 2D light-propagation texture, in one embodiment, a compute or pixel shader may be used by texture computation logic 1213 to populate the light-propagation texture with any light that propagates beyond a particular metavoxel. This light-propagation texture may be read for initial propagated light where appropriate, such as the propagated lighting may be read if there are metavoxels between the under-processed metavoxel and the light. For example and in one embodiment, in addition to computing each voxel's color and density, fill volume logic 1209 may use a compute shader and/or a pixel shader in communication with texture computation logic 1213 to write the final propagated light value to a light-propagation texture. The sample may then refer to this light-propagation texture by the name, such as $PropagateLighting. In some embodiments, this may be a 2D texture that covers the whole volume, such as the sample, as configured for a $1024^3$ volume (e.g., $32^3$ metavoxels, each with $32^3$ voxels), may have a 1024×1024 (32*32=1024) light-propagation texture. Further, this light-propagation texture includes space for each metavoxel's one-voxel border, and the value stored in the light-propagation texture may be the last non-shadowed value.

For example, each metavoxel may maintain a one-voxel border so that texture filtering, as facilitated by texture computation logic 1213, may work when sampling during the eye-view ray march as facilitated by ray march logic 1219. The sample may cast shadows from the volume onto the rest of the scene by projecting the light-propagation texture onto the scene, where a simple projection may show visual artifacts where the texture duplicates values to support the one-voxel border. These artifacts are avoided by adjusting the texture coordinates to accommodate the one-voxel border. For example, a sample code may be recited as follows:

float oneVoxelBorderAdjust=((float)(METAVOXEL_ WIDTH−2)/(float)METAVOXEL_WIDTH);
    float2 uvVol=input.VolumeUv.xy*0.5f+0.5f;
    float2 uvMetavoxel=uvVol*WIDTH_IN_METAVOXELS;
    int2 uvInt=int2(uvMetavoxel);
    float2 uvOffset=uvMetavoxel−(float2)uvInt−0.5f;
    float2 lightPropagationUv=((float2)uvInt+0.5f+uvOffset* oneVoxelBorderAdjust)*(1.0f/(float)WIDTH_IN_ METAVOXELS);

The light-propagation texture stores the light value at the last voxel that is not found in shadow and once the light propagation process encounters the shadowing surface, the propagated lighting goes to 0 (such as no light propagates past the shadow caster); however, storing the last light value allows for using the texture as a light map. Projecting this last-lighting value onto the scene may mean the shadow casting the surface receives the expected lighting value, where those surfaces that are in the shadow effectively ignore this light-propagation texture.

In addition to using the 2D light-propagation texture and the 3D volume texture, fill volume logic 1209 may further receive an input of shadow data as facilitated by shadow computation logic 1215 and stored at database 1230. As will be further illustrated and described with respect to FIG. 13D, in this obtained sample of the volume of the image, shadows may be cast from a scene onto the volume and vice versa, where the scene's opaque objects are first rendered to a shadow map. For example, the volume may receive shadows by referencing the shadow map at the beginning of light propagation which casts shadows by projecting the final light-propagation texture onto the scene. It is contemplated that this embodiment provides for a rather simple shadow map for brevity, clarity, and ease of understanding, but that embodiments are not limited as such and a much for complex shadow map may be employed. In one embodiment, any voxels that are found to be in the shadow may not be considered for the final image as they are not likely to be visible to the light and, in contrast, those voxels that are not in the shadow may be considered for the final image as they are more likely to be viewed to the light. This relevant data may be obtained via shadow computation logic 1215, stored at database 1230, and provided to full volume logic 1209 to determine the voxels that may or not be worthy of additional processing based on whether they are in the shadow or not.

Similarly, in one embodiment, depth computation logic 1217 may be employed and used to perform a depth test on the voxels in the sample as further illustrated and described with reference to FIG. 13E. In one embodiment, upon performing the depth test, depth computation logic 1217 may store the relevant data at database 1230 and forwarded it on to ray march logic 1219 for further processing. For example, any of the samples that fail the depth test are regarded as invisible and not to be viewed or noticed in the final images such that they are not processed by ray march logic 1219; however, in contrast, those voxels that pass the depth test are regarded as visible and likely to be viewed and noticed by the user in the final image and thus such voxels are processed by ray march logic 1219 to be in the final image.

In one embodiment, as illustrated and further described with reference to FIG. 13F, ray march logic 1219 the volume of the sample, where the ray may be marched from far to near with respect to the eye of the user. The ray march process may expand over any number of voxels of the metavoxels of the volume of the sample obtained from the image. For example, ray march logic 1219 may use a pixel shader and, based on the effect result texture and/or the depth test results, may consider each metavoxel independently as it ray marches each metavoxel one at a time, blending the results with the eye-view rendered target to generate a combined set of results.

In one embodiment ray marching, as facilitated by ray march logic 1219, performs ray marching of the overall volume one piece at a time that may include all or portions of one or more metavoxels at a time which is then used to convert the available data into final image. In ray marching the whole volume in pieces of volumes, such as metavoxels, the end border of a current metavoxel is appropriately aligned (e.g., intentionally overlapped) with the start border of a next metavoxel for the process to seamlessly continue the process of ray marching towards obtaining a final result. It is to be noted that metavoxels may intentionally overlap (where each maintains a piece of its neighbor) so that they can be processed independently.

In one embodiment, upon performing the ray marching process, composite logic 1221 may then be used to use the ray marching data to convert it to a final image which may then be displayed for the user to view. Since, in some embodiments, the final image may include both the primary portion of the volume relating to the non-fuzzy or defined part of the image, such as train in FIG. 13A, and the secondary portion of the volume relating to the fuzzy or undefined part of the image, such as smoke in FIG. 13B, where the secondary portion of the volume corresponds to the volume having sub-volumes or metavoxels contained in the sample that it processes via volumetric mechanism 1110. For example, composite logic 1221 may use a pixel shader to composite the final effect results texture with a back buffer, blending according to the alpha values stored in the texture. It is contemplated that bilateral-filtering improves quality when the final effect results texture's resolution is lower than that of the back buffer.

In one embodiment, composite logic 1221 ensures that the primary and second volumes are aligned and appropriately presented via the final image that includes both the non-fuzzy and fuzzy images. For example and in one embodiment, the result of the eye-view ray march may be a texture, such as an effect result texture, with a pre-multiplied alpha channel. A full screen sprite with alpha blending may be drawn that is enabled to composite with the back buffer, such as $Color_{dest}=Color_{dest}*Alpha_{src}+Color_{src}$, where the rendered states may be as follows: SrcBlend=D3D11_ BLEND_ONE and DestBlend=D3D11_BLEND_SRC_ ALPHA. Further, the sample may be supported to have an eye-view rendered target with a different resolution from the back buffer. For example, a smaller rendered target may significantly improve the performance as it reduces the total number of rays marched; however, when the render target is smaller than the back buffer, the composite step performs up-sampling which may result in generating cracks around silhouette edges. This issue may be addressed by up-sampling during the compositing processing as facilitated by composite logic 1221.

In one embodiment, back buffer logic 1223 may be used to ensure that the back buffer is properly aligned with the front buffer for rendering of the final image. It is contemplated that the front buffer holds the data that is displayed for the user to view as an image, where the back buffer include data that to follow the current data of the front buffer. Once the data from the front buffer has moved on, back buffer logic 1223 places the back buffer data into the front buffer to allow for a seamless view of one or more images by the user via a display device/screen.

Communication/compatibility logic 1225 may be used to facilitate dynamic communication and compatibility between one or more computing devices, such as computing device 1100 of FIG. 11, and any number and type of other computing devices (such as mobile computing device, desktop computer, server computing device, etc.), processing devices (such as central processing unit (CPU), graphics processing unit (GPU), etc.), image capturing devices (such as camera), display elements (such as display component, display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "GPU domain", "CPU", "CPU domain", "thread", "buffer", "OpenCL™" "OpenGL™", "volume", "sub-volume", "defined" or "undefined", "fuzzy" or "non-fuzzy", "voxel", "metavoxel", "fill volume", "ray march", "composite", "texture", "depth buffer", "shadow", "front buffer", "back buffer", etc., should not be read to limit embodiments to software or devices that carry that label in products or in literature external to this document.

It is contemplated that any number and type of components may be added to and/or removed from volumetric mechanism 1110 to facilitate various embodiments including adding, removing, and/or enhancing certain features. For brevity, clarity, and ease of understanding of volumetric mechanism 1110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 13A:
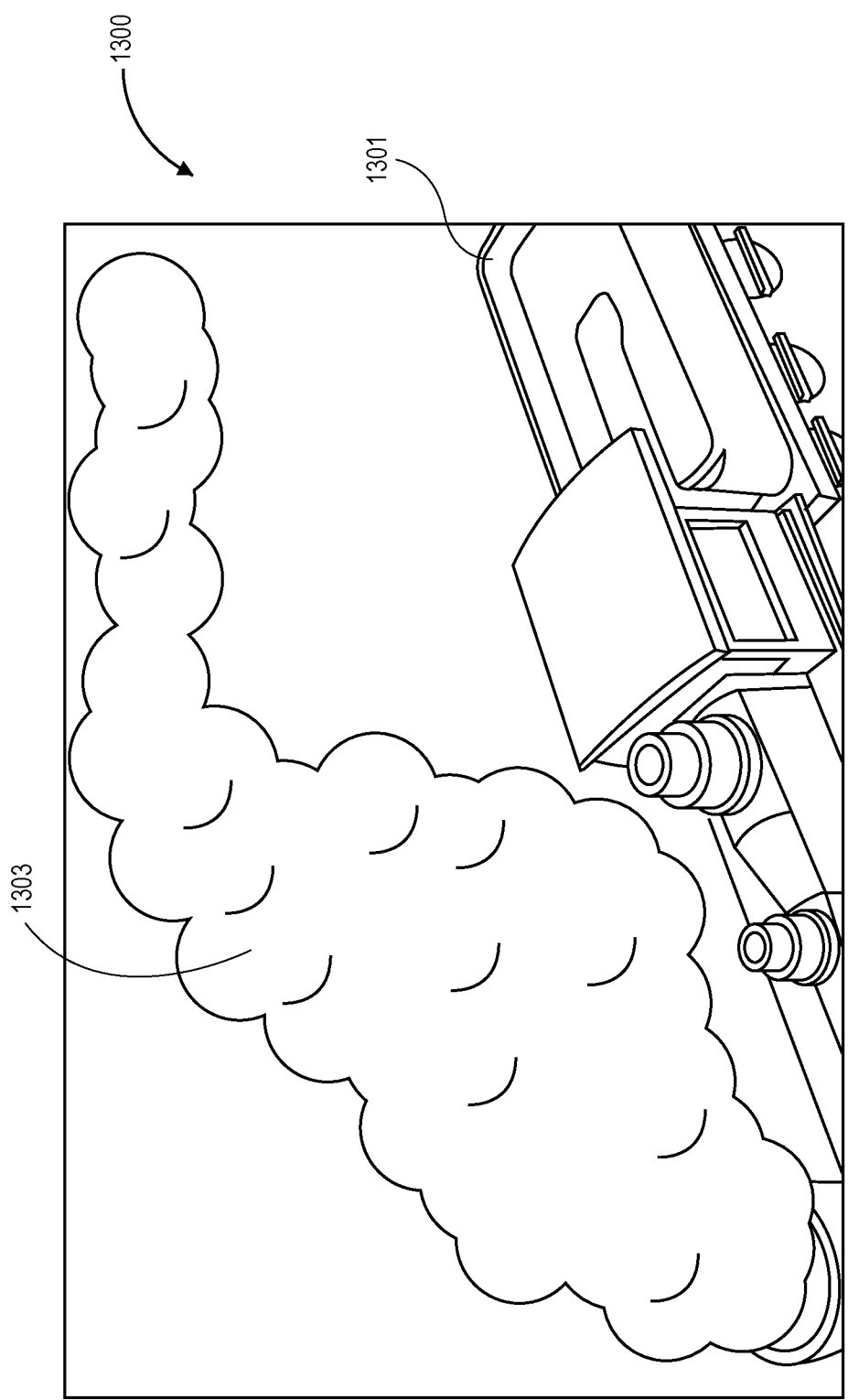
FIG. 13A illustrates an image having non-fuzzy and fuzzy images according to one embodiment.

FIG. 13A illustrates an image 1300 having non-fuzzy and fuzzy images 1301, 1303 according to one embodiment. For brevity, many of the details discussed with reference to the preceding FIGS. 1-12 may not be discussed or repeated hereafter. As illustrated, image 1300 may contain non-fuzzy or defined portion 1301, such as a train, where image 1300 further includes fuzzy or undefined portion 1303, such as the smoke coming out of the train. It is contemplated that portion 1301, being non-fuzzy and defined, may be displayed in its entirety for the user to view, while image 1303, being fuzzy and not so defined, may not have to be displayed in its entirety and merely smaller portions of some of the volume of image 1303 may be displayed without having the user to notice the missing portions of the volume of image 1303 as facilitated by volumetric mechanism 1110 of FIG. 12, making the rendering process highly efficient and low in cost in terms of the user of power, time, code processing, and other resources.

Figure 13B:
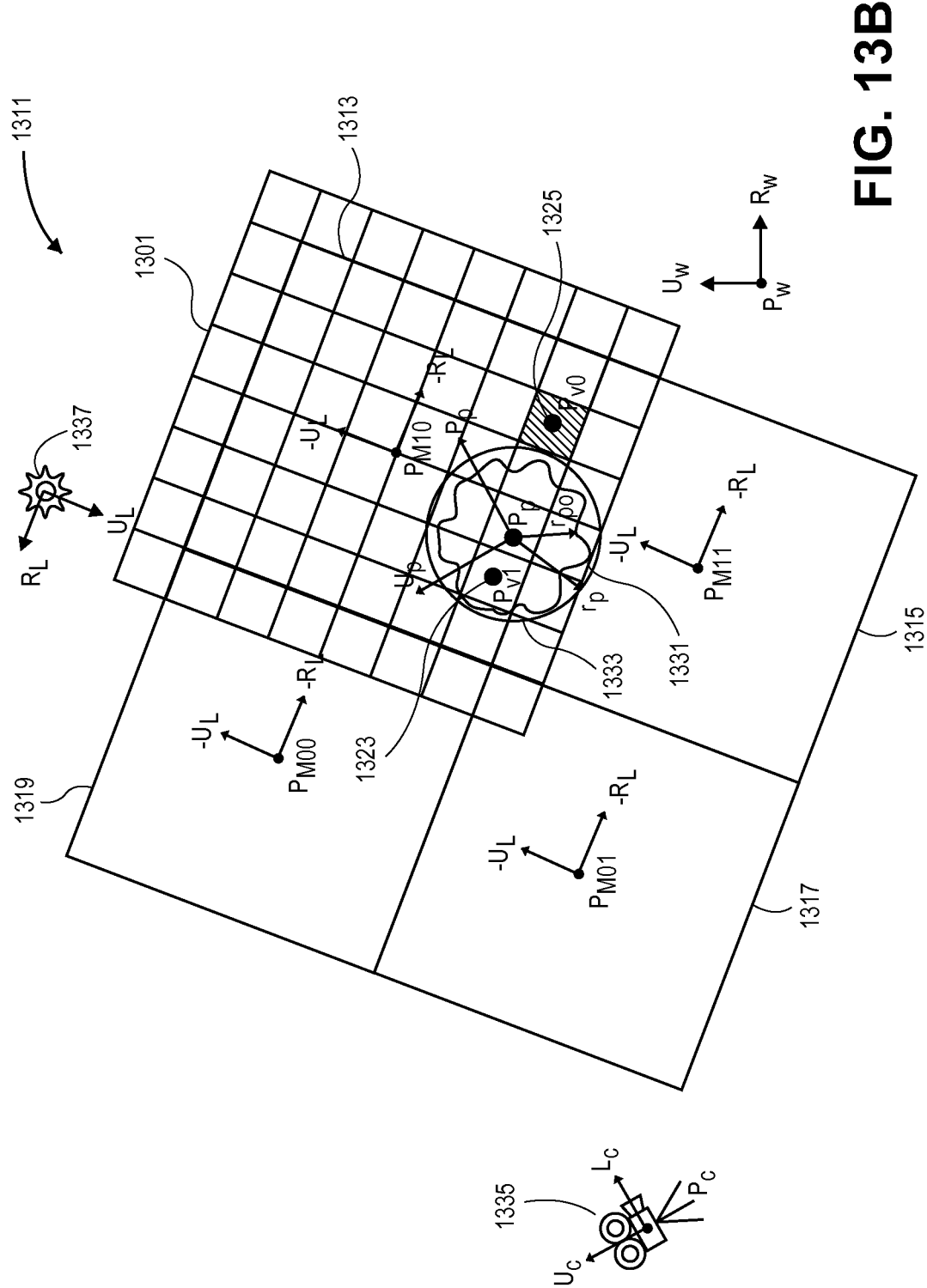
FIG. 13B illustrates volume that is divided into portions, such as metavoxels, according to one embodiment.

FIG. 13B illustrates volume 1311 divided into portions, such as metavoxels 1313-1319, according to one embodiment. It is to be noted that for brevity, many of the details discussed with reference to the preceding FIGS. 1-13A may not be discussed or repeated hereafter. As aforementioned, in one embodiment, volume 1311 may represent an entire image, such as image 1300 of FIG. 13A, may be broken down into smaller pieces, such as sub-volumes, shown here as metavoxels 1313-1319. In one embodiment, having divided volume 1311 into an array of metavoxels, such as metavoxels 1313-1319, each of which may include an array of voxels, such as voxels 1321, merely those metavoxels having voxels passing predefined tests or meeting predetermined criteria may be considered for processing and potential displaying in the final image.

Further, although metavoxels 1313-1319 and voxels 1321 are shown in 2D for brevity and clarity, it is contemplated that in one embodiment, these metavoxels 1313-1319 and voxels 1321 may also be provided in 3D representing a 3D array of metavoxels and a 3D array of voxels, respectively, of any size, form, properties, features, and/or the like. For example, a volume 1311 may include a total volume size of $1024^3$ in the form of each metavoxel 1313-1319 including a volume size of $32^3$ and each voxel 1321 including a volume of size of $16^3$, etc. It is further contemplated that for brevity, clarity, and ease of understanding, merely a small array of metavoxels 1313-1319 and correspondingly, a small array of voxels 1321 are illustrated but that a real-life graphics volume may include any number and type of metavoxels, voxels, and/or the like.

In one embodiment, as described with reference to FIG. 12, volumetric mechanism 1110 may be triggered to evaluate and process metavoxels 1313-1319 where each metavoxel is matched against volume primitive particles, such as particle 1331, obtained from their corresponding bins, such as at database 1230 of FIG. 12, where each bin may be associated with or correspond to a metavoxel, such as metavoxel 1313, which may include an array of voxels, such as voxels 1321. Further, particles may be obtained via division and binning logic 1203 of FIG. 12 using, for example, an embodiment of a simulation technology that is capable of obtaining not only 2D particles, but also 3D particles, such as particle 1331, to be matched against 3D metavoxels 1313-1319 and 3D voxels 1321. In one embodiment, the matching may be used to identify those metavoxels (e.g., metavoxel 1313) that are affected by the volume primitive particles (e.g., particle 1331) to compute the color and density of the affected voxels (e.g., voxel 1323) and ignore the unaffected voxels (e.g., voxel 1325) via fill volume logic 1209, propagate lighting via texture computation logic 1213, and ray march, via ray march logic 1219, the result form the eye's point of view to display the final image to the user for their viewing.

In some embodiments, a high efficiency with regard to the sample of volume 1311 may be achieved by, for example, populating volume 1311 by volume primitive particles, such as particle 1331. As illustrated, in one embodiment, a radially-displayed sphere or circle, such as bounding sphere 1333, may be applied to encompass particle 1331, and a cube map may be used to represent the displacement over the surface of sphere 1333. Using this technique, in one embodiment, metavoxel 1313 affected by volume primitive particle 1331 is identified and further processed as aforementioned, while other metavoxels 1315-1319 that remain unaffected by volume primitive particle 1331 are kept out of processing via volumetric mechanism 1110 of FIG. 12.

Similarly, in one embodiment, affected voxels, such as voxel 1323, that are found within particle 1331 are regarded as those having a non-zero values and are to be included in the fuzzy portion of the final image, while unaffected voxels, such as voxel 1325, that fall outside of particle 1331 are regarded as those having zero values are thus they are not to be included in the fuzzy portion of the final image. These values, whether they are zero or non-zero, may be obtained from the 3D volume texture as determined by texture computation logic 1213 and provided to fill volume logic 1209 and/or ray march logic 1219 as described with reference to FIG. 12.

Further, for example and in one embodiment, whether any voxels 1321 are within particle 1331 may be determined using one or more mathematical formulae based on distances, such as whether voxel 1323, 1325 fall within particle 1331 or outside as computed from the center, $P_P$, of particle 1331. For example, the distance between the center, $P_P$, of particle 1331 and the center, $P_{VT}$, of voxel 1323 is smaller than the distance between the center, $P_P$, of particle 1331 and the border (representing the radius), $r_{PD}$, of particle 1331 which is translated as voxel 1323 being inside particle 1331 and having a non-zero value and therefore may be selected to be part of the volume of the fuzzy portion of the image. Similarly, this distance formulae may be applied to voxel 1325 and since the distance between the center, $P_P$, of particle 1331 and the center, $P_{VO}$, of voxel 1325 is larger than the distance between the center, $P_P$, of particle 1331 and its border (representing the radius), $r_{PD}$, voxel 1325 is regarded as being outside particle 1331 and having a zero value and thus it is may not be selected for further processing to be part of the fuzzy portion of the final image.

With respect to the illustrated embodiment, for example, the following legend may be applied:

| | | |
|---|---|---|
| $P_W$ = World Origin Position | $P_P$ = Particle Position | $P_{MXY}$ = Metavoxel$_{XY}$ Position |
| $U_W$ = World Up | $U_P$ = Particle Up | $U_{MXY}$ = Metavoxel$_{XY}$ Up |
| $R_W$ = World Right | $R_P$ = Particle Right | $R_{MXY}$ = Metavoxel$_{XY}$ Right |
| $P_L$ = Light Position | $r_{PD}$ = Particle Radius | $P_C$ = Camera Position |
| $U_L$ = Light Up | $P_V$ = Position of voxel | $U_C$ = Camera Up |
| $U_R$ = Light Right | $P_{VI}$ = Position of voxel inside particle | $L_C$ = Camera Look |
| | $P_{VO}$ = Position of voxel outside particle | |

The illustrated embodiment further illustrates camera 1333, light source 1335, where each participant (e.g., voxels 1321, metavoxels 1313-1319, camera 1333, light source 1335, etc.) of the illustrated embodiment may be identified in relation to a reference frame, defined by a position P, an up vector U, a right vector R, etc. Similarly, the following is contemplated: each voxel 1321 may be capable of storing a color and a density; each metavoxel 1313-1319 may be a 3D metavoxel and include an array of 3D voxels, such as voxels 1321, and stored as a 3D texture; volume 1311 represents the overall volume of the image and is composed of multiple metavoxel 1313-1319 (simplified here by 2×2 metavoxels 1313-1319); particle 1331 may include a radically-displaced sphere volume primitive as bounded by sphere 1333, where particle 1331 may be a 3D particle and not necessarily a 2D billboard; and camera 1335 may be the same camera that is used for rendering the rest of the scene from the user's eye's perspective.

In one embodiment, the sample of volume 1311 may also make an efficient use of system memory and thus any volume primitive particles, such as particle 1331, may be compressed to represent a compressed description of the contents of volume 1311. Further, volumetric mechanism 1110 may decompress the particles on the fly, iterating between populating by fill volume logic 1209 and ray marching metavoxels 1313-1319 by ray march logic 1219, where this switch may be performed for every metavoxel, such as metavoxel 1313. However, this switching between filling and ray marching may have various costs (e.g., changing shaders) associated with it and thus volumetric mechanism 1110 may support filling a list of metavoxels, such as metavoxel 1313, before switching to ray marching them, allocating a relatively small array of metavoxels 1313-1319, reusing them as needed to process total volume 1311, etc.

In one embodiment, the sample of volume 1311 is used by volumetric mechanism 1110 to determine if each voxel, such as each voxel of voxels 1321, is inside (or outside) each particle, such as particle 1331. Although the illustrated embodiment is a 2D illustration for brevity and simplification, it is contemplated that particle 1331 may be a radially-displaced 3D or circular particle encompassed by a 3D bounding sphere, such as sphere 1333.

As illustrated, the bounding radius of particle 1331 is represented as $r_P$ and its displaced radius is $r_{PD}$ such that particle 1331 covers the voxel if the distance between the particle center, $P_P$, of particle 1331 and the voxel center, $P_{VT}$, of voxel 1323 is less than the displaced distance $r_{PD}$ form the particle center, $P_P$, of particle 1331. Accordingly, for example, voxel 1323 having its voxel center at $P_{VT}$ is regarded as inside particle 1331, while voxel 1325 having its voxel center at $P_{VO}$ is outside particle 113, such as Inside=$|P_V-P_P|<r_{PD}$, as facilitated by fill volume logic 1209 and one or more components of computation engine 1211 of FIG. 12. Similarly, fill volume logic 1209 along with computation engine 1211 may inexpensively compute the square of a vector's length, avoiding a relatively-expensive sqrt( ) by comparing the squares of the lengths, such as Inside= $(P_V-P_P)\cdot(P_V-P_P)<r_{PD}^2$. Further, in one embodiment, color and density, as facilitated by fill volume logic 1209, may be regarded as functions of position of voxel 1325 that is within particle 1331, and the distance to the particle surface, $r_{PD}$, along the line from the particle center, $P_P$, of particle 1331 through the voxel center, $P_{VT}$, of voxel 1323, where C=color $(P_V-P_P, r_{PD})$, D=density$(P_V-P_P, r_{PD})$.

Further, various density functions may be employed and considered, such as (without limitation): 1) binary function, if voxel 1323 is inside particle 1331, color=C, and density=D, where C and D may be constant; otherwise, C=any color, such as black, and D=0, etc.; 2) gradient function, if the color varies from C1 to C2 and the density varies from D1 to D2 as distance from the position of voxel 1323 varies from the particle center of particle 1331 to the particle surface of particle 1331; and 3) texture lookup function, if the color is stored in 1D, 2D and/or 3D texture and looked up using a three-axis distance (X, Y, Z). The sample of volume 1311 may further implement a constant color, where the ambient term is given by the displacement value and the gradient from one color to another color (such as from bright yellow to black, etc.) is based on radius and particle age of particle 1331.

In one embodiment, a number of processes may be used to specify positions of voxel 1323 and particle 1331 within metavoxel 1313, such as (without limitation): 1) normalized process including one or more of float, original at metavoxel center, such as $P_{M10}$, and range, such as −1.0 to 1.0; 2) texture coordinates process including one or more of float (e.g., converted to fixed-point by texture fetch machinery), origin at, for example, top-left corner for 2D (e.g., top-left-back from 3D), range from 0.0 to 1.0, and voxel centers at 0.5/metavoxelDimensions (e.g., 0.0 may be a corner of voxel 1323, where 0.5 may be its center); 3) voxel index process including one or more of integer, origin at, for example, top-left corner for 2D (e.g., top-left-back for 2D), range 0 to metavoxelDimensions−1, and Z might be the light direction and X and Y may be plane perpendicular to the light direction.

Further, in some embodiments, the position of voxel 1323 in the space of metavoxel 1313 may be given by the metavoxel center position, $P_M$, and the indices (X, Y) of voxel 1323. These indices may be kept discrete, varying from 0 to N-1 across the dimensions of metavoxel 1313, such as, in the illustrated embodiment, a simplified 2×2 grid of 8×8-voxel metavoxels with $P_{VT}$ in metavoxel (1,0) at voxel position (2,6) is shown.

Figure 13C:
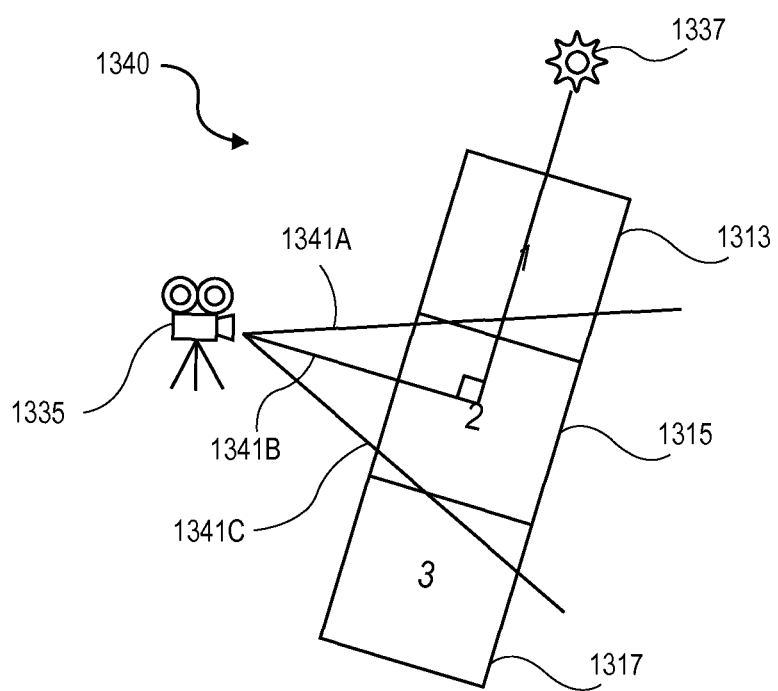
FIG. 13C illustrates an arrangement for sorting orders for metavoxel rendering according to one embodiment.

FIG. 13C illustrates an arrangement 1340 for sorting orders for metavoxel rendering according to one embodiment. It is to be noted that for brevity, many of the details discussed with reference to the preceding FIGS. 1-13B may not be discussed or repeated hereafter. As described in FIG. 12 with reference to sorting logic 1205 of volumetric mechanism 1110, in one embodiment, metavoxel rendering may be performed and based on one or more sort orders, such as one sort order with respect to the light as determined using light source 1337 and another sort order with respect to the eye as determined using camera 1335. It is contemplated that light propagation may start at metavoxels closest to the light, such as beginning with metavoxel 1313 being closest to the light as it is nearest to light source 1337, and progress through more distant metavoxels, such as metavoxel 1317 being the farthest from the light. Since metavoxels 1313-1317 may be semi-transparent, sorting from the eye view may also be performed to correct any deficiencies with regard to the light-based sorting. With regard to the eye-based sorting, sorting may be performed from back to front with over-alpha blending, or front to back with under-alpha blending as determined by alpha blending logic 1207 of volumetric mechanism 1110.

In the illustrated embodiment, three metavoxels 1-3 1313-1317 are shown in a simple arrangement 1340 including camera 1335 for the eye, and light source 1337 for the light, etc. Light propagation may be based on an order of metavoxel 1 1313, 2 1315, and 3 1317 such that the light is propagated through metavoxel 1313 to determine how much of the light makes it to metavoxel 1315 and continuing on with propagating the light through metavoxel 1315 to determine how much of the light makes it to metavoxel 1317.

With regard to sorting metavoxels 1313-1317 from the eye's perspective, if metavoxels 1313-1317 are in the front-to-back direction, metavoxel 1315 is rendered first, while metavoxels 1315 and 1317 are set to follow behind metavoxel 1313, such that the light may be propagated through metavoxels 1313 and 1315 before metavoxel 1315 is rendered and, in some embodiments, the light may be propagated through the entire column of metavoxels 1313-1317 before any of them are rendered. For example, in case of rending back-to-front, each metavoxel 1313-1317 may be rendered immediately after its light has been propagated.

In some embodiments, the back-to-front sorting and the front-to-back sorting may be combined to support the ability to render metavoxels 1313-1317 immediately after propagating the light. Further, metavoxels 1313-1315 may be rendered above the perpendicular (as indicated by middle line 1341A of lines 1341A-C) back-to-front with over-alpha blending, followed by metavoxels 1315-1317 below the perpendicular front-to-back with under-alpha blending. This ordering produces the correct results without requiring enough memory to hold an entire column of metavoxels 1313-1317; however, a front-to-back sort with under-alpha blending may also be performed when, for example, the software application is willing to commit enough memory.

Figure 13D:
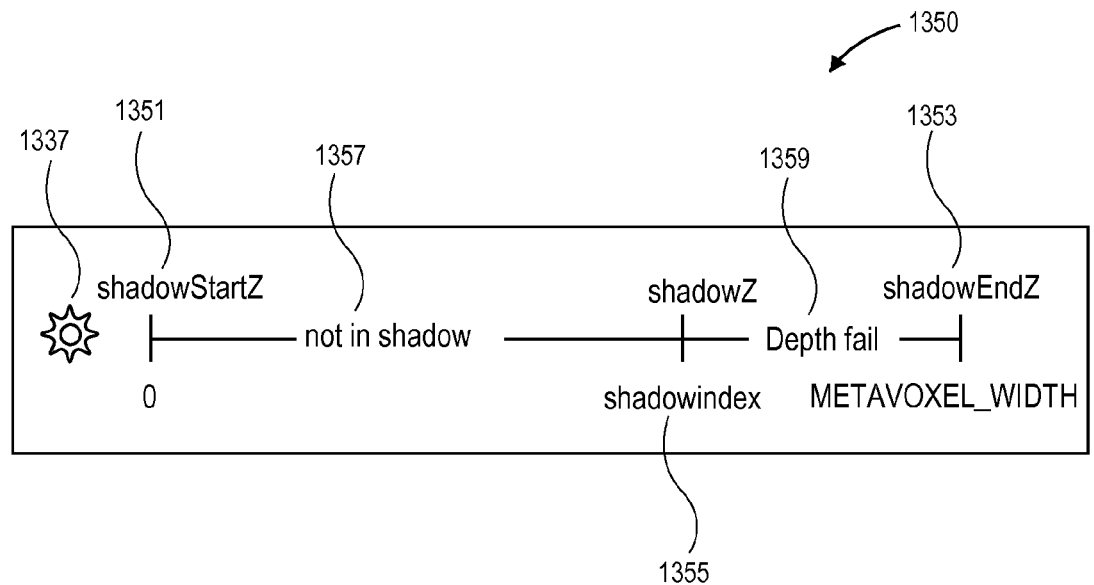
FIG. 13D illustrates a shadow map according to one embodiment.

FIG. 13D illustrates a shadow map 1350 according to one embodiment. It is to be noted that for brevity, many of the details discussed with reference to the preceding FIGS. 1-13C may not be discussed or repeated hereafter. As previously described with reference to FIG. 12, shadows computation logic 1215 may implement and facilitate shadows cast from the scene to the volume of the image and from the volume to the scene of the image. First, a scene's opaque objects are rendered to a simple shadow map, such as shadow map 1350, where the volume receives shadows by referencing shadow map 1350 at the beginning of light propagation. The shadows may be cast by projecting the final light-propagation texture onto the scene as discussed with reference to texture computation logic 1213 of FIG. 12.

In the illustrated embodiment, shadow map 1350 provides for a relationship between shadow Z values and indices. For example, the volume receives shadows by referencing shadow map 1350 at the beginning of light propagation relating to the light facilitated by light source 1337. The illustrated shadow map 1350 relating to a metavoxel runs from its start 1351 (e.g., shadowStartZ) nearest to light source 1337 to its end 1353 (e.g., shadowEndZ) farthest from light source 1337. In one embodiment, the distance between start 1351 and 1353 reflects entire width of the metavoxel (e.g., METAVOXEL_WIDTH) that the subject of shadow map 1350. Since the metavoxel may be a 3D metavoxel including a 3D cube, its METAVOXEL_WIDTH may also include height and depth. Further, it is to be noted that shadow index 1355 (e.g., shadowIndex) is reflected by a point where the light ends and the darkness begins on shadow map 1350.

In one embodiment, any voxels of the metavoxel that are found near the light or in "not in shadow" area 1357 may be regarded as visible to the light and likely to be important for the final visual and thus they are considered for being included in the volume of the fuzzy portion of the final image by being selected to be processed by fill volume logic 1209 and other components of volumetric mechanism 1110 of FIG. 12. In contrast, any voxels of the metavoxel that are found in "in shadow" area 1359 may be regarded as not likely to be visible to the light or their lighting is 0 for being in the shadow and thus they are not included in the final image and so such voxels are not processed to be included in the volume of the fuzzy portion of the final image. Stated differently, voxels falling before shadow index 1355 are not in the shadow, while those voxels falling after shadow index 1355 are considered in the shadow. The relevant shadow data may be stored at database 1230 and communicated by shadows computation logic 1215 to fill volume logic 1209 of FIG. 12.

The volume may receive shadows by referencing shadow map 1350 at the beginning of light propagation. It casts shadows by projecting the final light-propagation texture onto the scene. The shader samples shadow map 1350, for example, once per-metavoxel (e.g., per voxel column) and determines the index (e.g., row within the column) at which the first voxel falls or not falls in the shadow.

Further, shadow index 1355 may vary from 0 at start 1351 to METAVOXEL_WIDTH at end 1353 as the shadow value varies from the top of the metavoxel to the bottom. Further, the metavoxel local space may be centered at (0, 0, 0) and range from −1.0 to 1.0 and thus, the top of the metavoxel may be placed at (0, 0, −1), and the bottom may be placed at (0, 0, 1). Similarly, for example, transforming to light/shadow space may give:

Top=(LightWorldViewProjection._m23−Light World ViewProjection._m22); and
Bottom=(LightWorldViewProjection_m23+LightWorld-ViewProjection_m22).

Figure 13E:
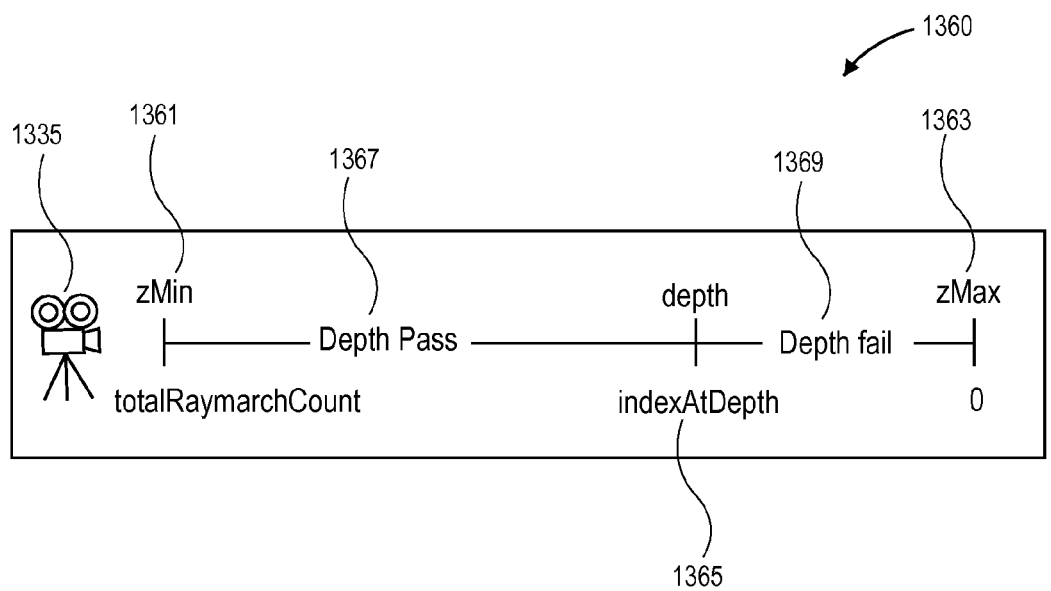
FIG. 13E illustrates a depth test map according to one embodiment.

Further, resulting in the following shader code as facilitated by fill volume logic 1209 of FIG. 12 may provide as follows:

float shadowZ=Shadow.Sample(ShadowSampler, lightU-v.xy).r;
float startShadowZ=Light World ViewProjection._m23−LightWorldViewProjection._m22;
float endShadowZ=Light World ViewProjection._m23+LightWorldViewProjection._m22;
unit shadowIndex=METAVOXEL_WIDTH*(shadowZ−startShadowZ)/(endShadowZ−startShadowZ);

FIG. 13E illustrates a depth test map 1360 according to one embodiment. It is to be noted that for brevity, many of the details discussed with reference to the preceding FIGS. 1-13D may not be discussed or repeated hereafter. As with the light-based shadow map 1350 of FIG. 13D, the eye view-based depth test map 1360 provides a depth test for each of the voxels of each of the metavoxels to determine whether any of the voxels pass or fail their depth test as facilitated by depth computation logic 1217. In the illustrated depth test map 1360, a relationship between depths and indices is provided on a slider which begins with minimum value 1361 that is closest to camera 1335 and ends with maximum value 1363 that is farthest from camera 1335. In one embodiment, any voxels that fall in the area of depth pass 1367, such as before the point of depth index 1365 (e.g., indexAtDepth), are regarded as passing the depth test and thus may be considered by ray march logic 1219 of FIG. 12 for further processing to be included in the volume of the fuzzy portion of the final image. In contrast, in one embodiment, any of the voxels that fall in the area of depth fail 1369, such as after the point of depth index 1365, are regarded as failing the depth test may not be processed or considered to be included in the volume of the fuzzy portion of the final image. The relevant depth test data may be stored at database 1230 and communicated by depth computation logic 1217 to ray march logic 1219 of FIG. 12.

Figure 13F:
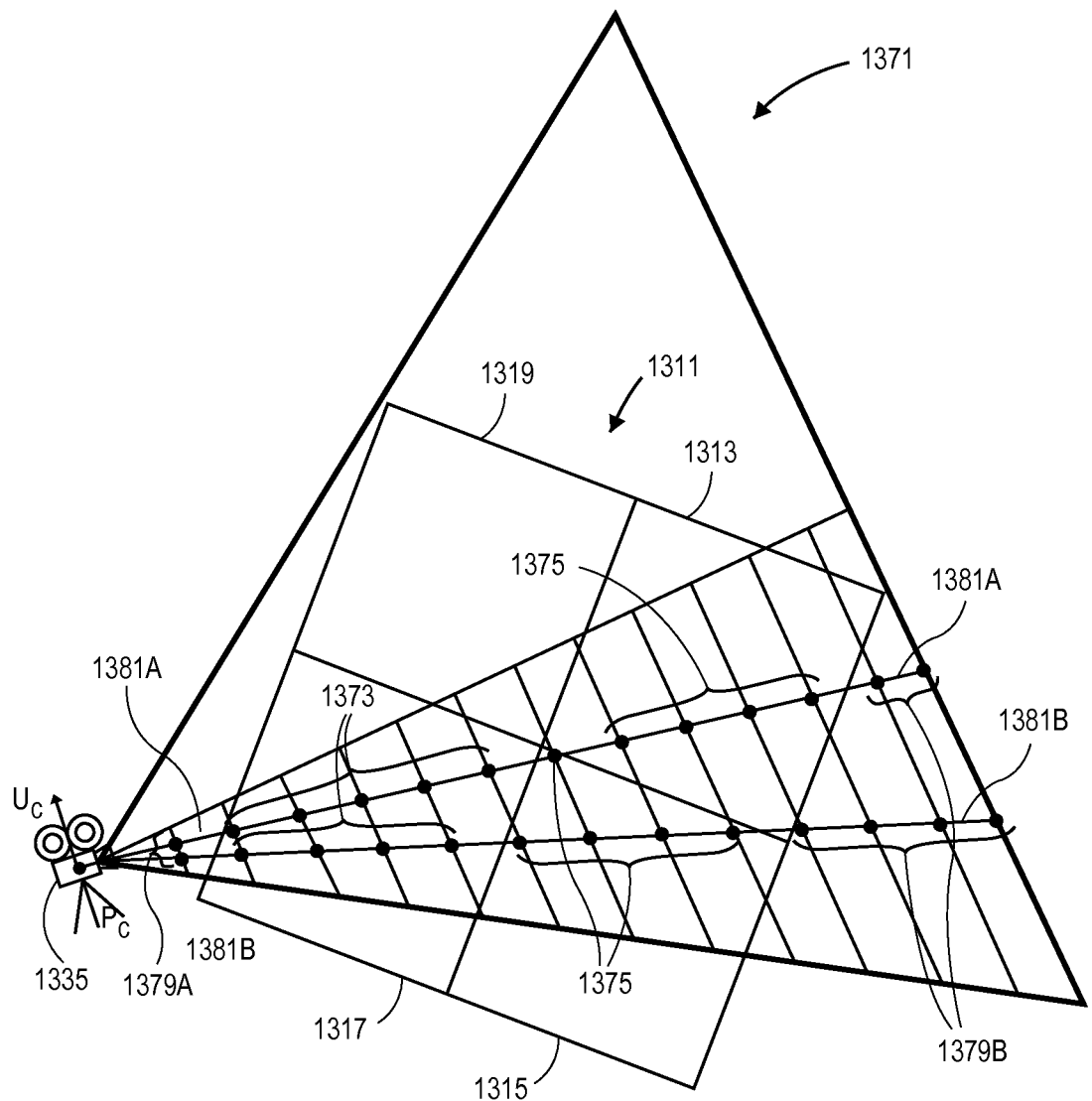
FIG. 13F illustrates ray marching of metavoxels according to one embodiment.

FIG. 13F illustrates ray marching 1371 of metavoxels 1313-1319 according to one embodiment. It is to be noted that for brevity, many of the details discussed with reference to the preceding FIGS. 1-13E may not be discussed or repeated hereafter. In one embodiment, as discussed with reference to ray march logic 1219 of FIG. 12, ray marching of metavoxels 1313-1319 is performed via, for example, a pixel shader and using the sampling from the 3D texture as a shader resource view (SRV). As illustrated, in one embodiment, ray march logic 1219 may facilitate marching of each ray from far to near with respect to the eye as represented by camera 1335. For example, samples from metavoxel's 3D texture may be filtered, where each sampled color adds to the final color of the image, while each sampled density may occlude the final color and the final alpha bending. For example, blend=$1/(1+\text{density}_n)$, $\text{color}_{result}=\text{color}_{result}$*blend+$\text{color}_n$*(1−blend), and $\text{alpha}_{result}=\text{alpha}_{result}$*blend. The color and density may be provided by fill volume logic 1209 of FIG. 12.

In one embodiment, each metavoxel may be processed independently for ray marching, while blending the results with an eye-view render target to generate a combined result. The pixel shader, as facilitated by ray march logic 1219, may march each metavoxel by drawing a cube (e.g., 12 triangles) from the eye's point of view and further, the pixel shader marches a ray through each pixel covered by the cube. It renders the cube with a front-face culling so the pixel shader executes merely once for each covered pixel; however, if it rendered without culling, then each ray could be marched twice, such as once for the front faces, and once for the back faces. If it is rendered with back-face culling, then when camera 1335 is inside the cube, the pixels would be culled, and the rays are not marched.

In the illustrated embodiment, two rays 1381A, 1381B, shown as two lines, are marched through four metavoxels 1313-1319 while distributing ray processes along the way on each ray 1381A, 1381B. The distance between the processes is the same when projected onto the look vector which means the processes are longer for off-axis rays. In another embodiment, equal processes may be performed for all rays 1381A, 1381B. It is to be noted that the sampling points start on the far plane and not on the metavoxel's back surface which matches how they would be sampled for a monolithic volume, without the concept of metavoxels 1313-1319, and starting the ray march on each metavoxel's back surface results in visible seams at metavoxel boundaries.

The illustrated embodiment further shows how the various samples points of voxels land in different metavoxels 1313-1319, such as about 9 voxel sample points 1373 are shown as landing in metavoxel 1317 and similarly, moving away from camera 1335, 5 voxel sample points 1375 land in metavoxel 1315, 4 voxel sample points 1377 land in metavoxel 1315, and none of the voxel sample points land in metavoxel 1319. Similarly, nearly 8 voxel sample points 1379A, 1379B are shown to land outside any of the four metavoxels 1313-1319, where 2 voxel sample points 1379A are near camera 1335 and 6 voxel sample points 1379B are shown away from camera 1335.

Figure 14A:
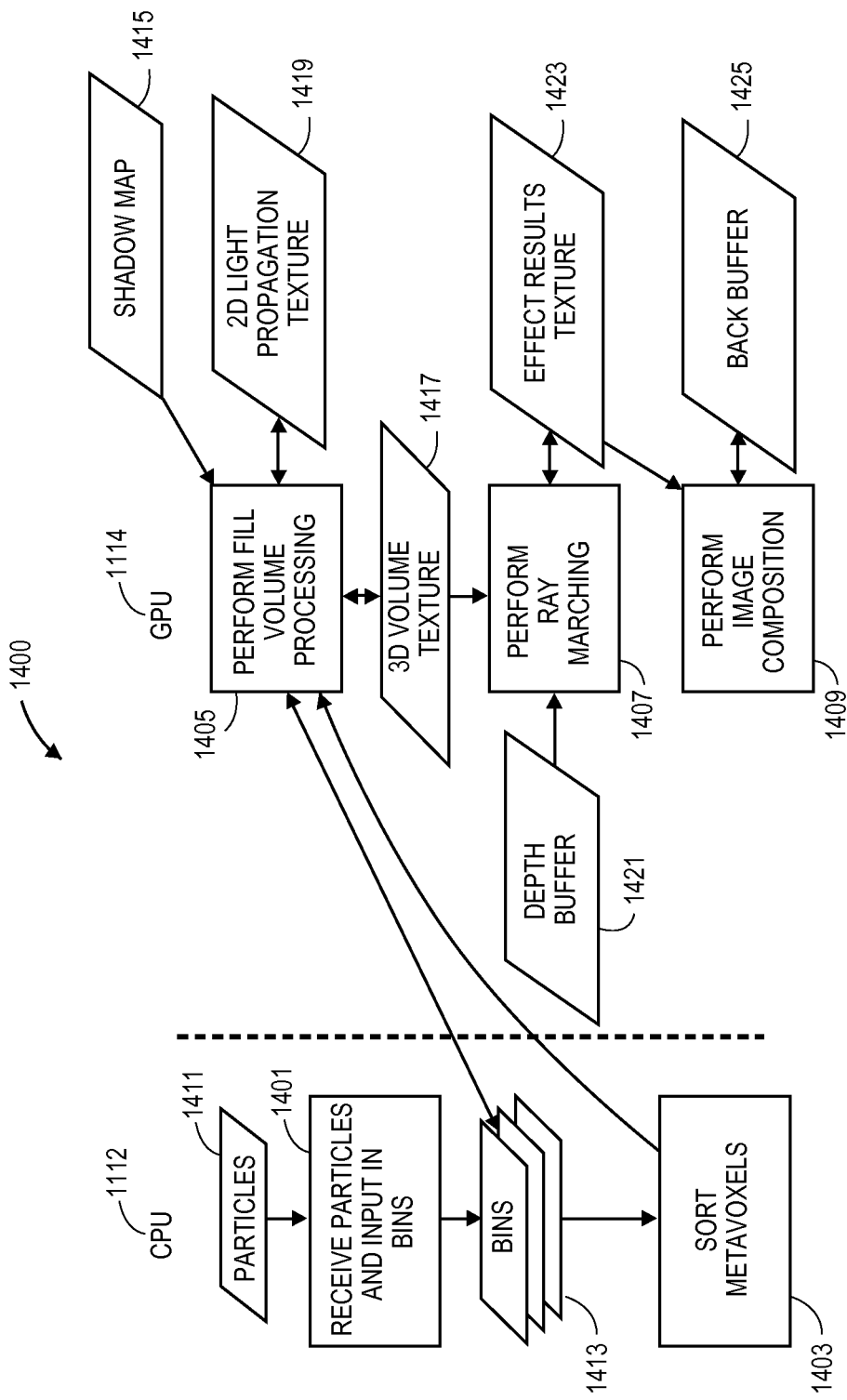
FIG. 14A illustrates a transaction sequence for facilitating dynamic real-time volumetric rendering of graphics images according to one embodiment.

FIG. 14A illustrates a transaction sequence 1400 for facilitating dynamic real-time volumetric rendering of graphics images according to one embodiment. Transaction sequence 1400 may be performed by processing logic that may comprise hardware (e.g., circuitry, dedicated logic, programmable logic, etc.), software (such as instructions run on a processing device), or a combination thereof. In one embodiment, transaction sequence 1400 may be performed by volumetric mechanism 1110 of FIGS. 11-12. The processes of transaction sequence 1400 are illustrated in linear sequences for brevity and clarity in presentation; however, it is contemplated that any number of them can be performed in parallel, asynchronously, or in different orders. For brevity, many of the details discussed with reference to the preceding FIGS. 1-13F may not be discussed or repeated hereafter.

Transaction sequence 1400 begins at a CPU, such as CPU 1112 of FIG. 11, at block 1401 with receiving of volume primitive particles at block 1411 and placing them in various bins 1413. In one embodiment, one or more particles of particles 1411 may correspond to one or more metavoxels, where each metavoxel is associated with a bin of bins 1413. At block 1403, the metavoxels are sorted in one or more orders, such as one from the light's perspective and another one from the eye's perspective.

In one embodiment, transaction sequence 1400 continues with block 1405 where fill volume processing is performed, via a compute shader and/or a pixel shader, and using one or more inputs of particles 1411 from bins 1413, sorted metavoxels from block 1403, computed shadows 1415, 3D volume texture 1417, and 2D light propagation texture 1419. Transaction sequence 1400 continues at block 1407 with ray marching of the metavoxels using one or more inputs of fill volume results from block 1405, 3D volume texture 1417, depth test results from depth buffer 1421, and effect results texture 1423. At block 1409, an image composition is performed using an input from effect results texture 1423 and in communication back buffer 1425 to appropriately set the front and back buffers for image rendering, where a final image is prepared and rendered using a combination rendering of the primary volume associated with the non-fuzzy portion of the image and the volumetric rending of the secondary volume associated with the fuzzy portion of the image.

Figure 14B:
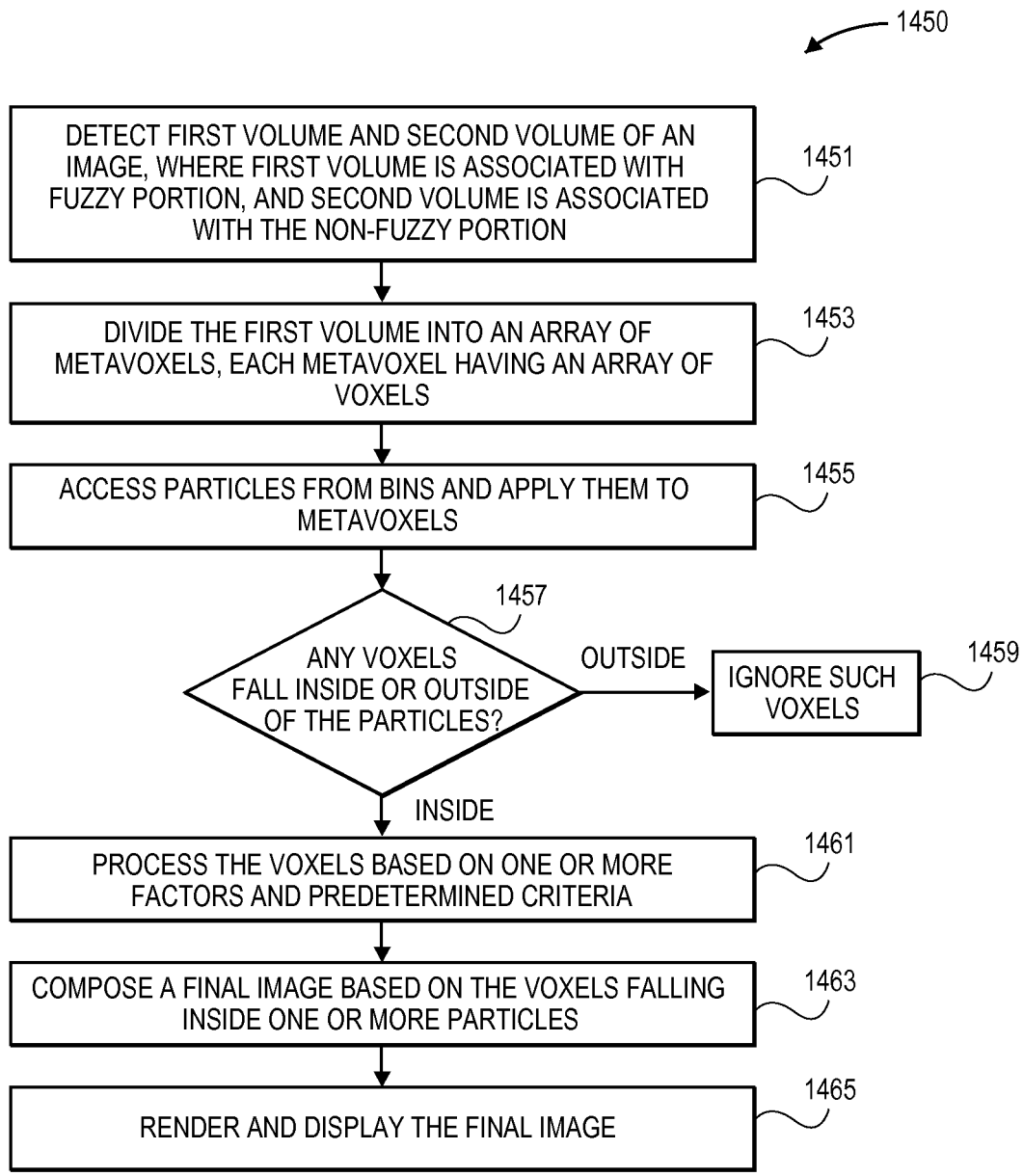
FIG. 14B illustrates a method for facilitating dynamic real-time volumetric rendering of graphics images according to one embodiment.

FIG. 14B illustrates a method 1450 for facilitating dynamic real-time volumetric rendering of graphics images according to one embodiment. Method 1450 may be performed by processing logic that may comprise hardware (e.g., circuitry, dedicated logic, programmable logic, etc.), software (such as instructions run on a processing device), or a combination thereof. In one embodiment, method 1450 may be performed by volumetric mechanism 1110 of FIGS. 11-12. The processes of method 1450 are illustrated in linear sequences for brevity and clarity in presentation; however, it is contemplated that any number of them can be performed in parallel, asynchronously, or in different orders. For brevity, many of the details discussed with reference to the preceding FIGS. 1-14A may not be discussed or repeated hereafter.

Method 1450 begins at block 1451 with detecting of volumes associated with both a fuzzy portion (e.g., cloud 1303 of FIG. 13A) and a non-fuzzy portion (e.g., train 1301 of FIG. 13A) of an image, where the overall volume of the image may be detected as a first volume associated with the fuzzy portion and a second volume associated with the non-fuzzy portion. In one embodiment, as aforementioned, since a fuzzy portion is inherently not defined, not all of the first volume may need to be rendered in the final image and thus volumetric mechanism 1110 may be applied to for dynamic volumetric rendering of the first volume. At block 1453, in one embodiment, the volume, including the first volume, may be divided into an array of metavoxels, where each metavoxel may include an array of voxels.

At block 1455, volume primitive particles obtained at the CPU and stored at the bins may be accessed and applied against the metavoxels to determine voxels falling inside or outside one or more particles. At block 1457, a determination is made as to whether any of the voxels fall inside or outside any of the particles. At block 1459, any voxels that are not found inside any of the particles are not determined as essential enough to be displayed in the final image and thus they may be dropped from further processing, saving system resources in terms of code processing, time, power, and memory.

As aforementioned, at block 1461, in some embodiments, any number and types of other factors and/or computations, such a depth test results, shadow results, sorting results, etc., may also be applied to the metavoxels to determine whether any of the voxels are to be further processed or not in order to be made part of the final image to maximize the usage of volumetric rendering of the first volume associated with the fuzzy portion of the image.

At block 1463, a final image is composed and prepared for rendering, where the composition takes into consideration both the volumetric rendering of the first volume associated with the fuzzy portion and the regular volume rendering of the second volume associated with the non-fuzzy portion. At block 1465, the final image is rendered and subsequently, displayed for the user to view on a display screen.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic real-time volumetric rendering of graphics images on computing devices, comprising: division and binning logic to divide a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels; fill volume logic to apply particles to each metavoxel to detect a first set of voxels found inside one or more particles, and a second set of voxels found outside the particles; and compositing and rendering logic to generate, based on the first set of voxels, a second image from the first image, wherein the compositing and rendering logic is further to render the second image.

Example 2 includes the subject matter of Example 1, wherein the division and binning logic is further to place the particles in a plurality of bins corresponding to the array of metavoxels, wherein the fill volume logic to receive the particles from the plurality of bins, wherein the particles include volume primitives.

Example 3 includes the subject matter of Example 1, wherein the fill volume logic is further to select the first set of voxels to be included in the second image.

Example 4 includes the subject matter of Example 3, wherein the fill volume logic is further to reject the second set of voxels from being included in the second image.

Example 5 includes the subject matter of Example 1, wherein compositing and rending logic is further to composite the second volume and the first set of voxels in generating the second image from the first image.

Example 6 includes the subject matter of Example 1, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

Example 7 includes the subject matter of Example 1, further comprising shadows computation logic of a computation engine to perform a shadow test on the plurality of metavoxels, wherein the shadow test to determine at least one of a shadowed portion and a non-shadowed portion of each metavoxel, wherein the non-shadowed portion is included in the second image, wherein the shadowed portion is not included in the second image.

Example 8 includes the subject matter of Example 7, wherein the computation engine further includes depth computation logic to perform a depth test on the plurality of metavoxel, wherein the depth test to determine at least one of a depth-passing portion and a depth-failing portion of each metavoxel, wherein the depth passing portion is included in the second image, wherein the depth failing portion is not included in the second image.

Some embodiments pertain to Example 9 that includes a method for facilitating dynamic real-time volumetric rendering of graphics images on computing devices, comprising: dividing a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels; applying particles to each metavoxel to detect a first set of voxels found inside one or more particles, and a second set of voxels found outside the particles; and generating, based on the first set of voxels, a second image from the first image, wherein the compositing and rendering logic is further to render the second image.

Example 10 includes the subject matter of Example 9, further comprising: placing the particles in a plurality of bins corresponding to the array of metavoxels; and receiving the particles from the plurality of bins, wherein the particles include volume primitives.

Example 11 includes the subject matter of Example 9, further comprising selecting the first set of voxels to be included in the second image.

Example 12 includes the subject matter of Example 11, further comprising rejecting the second set of voxels from being included in the second image.

Example 13 includes the subject matter of Example 9, further comprising compositing the second volume and the first set of voxels in generating the second image from the first image.

Example 14 includes the subject matter of Example 9, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

Example 15 includes the subject matter of Example 9, further comprising performing a shadow test on the plurality of metavoxels, wherein the shadow test to determine at least one of a shadowed portion and a non-shadowed portion of each metavoxel, wherein the non-shadowed portion is included in the second image, wherein the shadowed portion is not included in the second image.

Example 16 includes the subject matter of Example 15, further comprising performing a depth test on the plurality of metavoxel, wherein the depth test to determine at least one of a depth-passing portion and a depth-failing portion of each metavoxel, wherein the depth passing portion is included in the second image, wherein the depth failing portion is not included in the second image.

Example 17 includes at least one machine-readable medium comprising a plurality of instructions, when executed on a computing device, to implement or perform a method or realize an apparatus as claimed in any preceding claims.

Example 18 includes at least one non-transitory or tangible machine-readable medium comprising a plurality of instructions, when executed on a computing device, to implement or perform a method or realize an apparatus as claimed in any preceding claims.

Example 19 includes a system comprising a mechanism to implement or perform a method or realize an apparatus as claimed in any preceding claims.

Example 20 includes an apparatus comprising means to perform a method as claimed in any preceding claims.

Example 21 includes a computing device arranged to implement or perform a method or realize an apparatus as claimed in any preceding claims.

Example 22 includes a communications device arranged to implement or perform a method or realize an apparatus as claimed in any preceding claims.

Some embodiments pertain to Example 23 includes a system comprising a storage device having instructions, and a processor to execute the instructions to facilitate a mechanism to perform one or more operations comprising: dividing a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels; applying particles to each metavoxel to detect a first set of voxels found inside one or more particles, and a second set of voxels found outside the particles; and generating, based on the first set of voxels, a second image from the first image, wherein the compositing and rendering logic is further to render the second image.

Example 24 includes the subject matter of Example 23, wherein the one or more operations further comprise: placing the particles in a plurality of bins corresponding to the array of metavoxels; and receiving the particles from the plurality of bins, wherein the particles include volume primitives.

Example 25 includes the subject matter of Example 23, wherein the one or more operations further comprise selecting the first set of voxels to be included in the second image.

Example 26 includes the subject matter of Example 25, wherein the one or more operations further comprise rejecting the second set of voxels from being included in the second image.

Example 27 includes the subject matter of Example 23, wherein the one or more operations further comprise compositing the second volume and the first set of voxels in generating the second image from the first image.

Example 28 includes the subject matter of Example 23, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

Example 29 includes the subject matter of Example 23, wherein the one or more operations further comprise performing a shadow test on the plurality of metavoxels, wherein the shadow test to determine at least one of a shadowed portion and a non-shadowed portion of each metavoxel, wherein the non-shadowed portion is included in the second image, wherein the shadowed portion is not included in the second image.

Example 30 includes the subject matter of Example 29, wherein the one or more operations further comprise performing a depth test on the plurality of metavoxel, wherein the depth test to determine at least one of a depth-passing portion and a depth-failing portion of each metavoxel, wherein the depth passing portion is included in the second image, wherein the depth failing portion is not included in the second image.

Some embodiments pertain to Example 31 includes an apparatus comprising: means for dividing a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels; means for applying particles to each metavoxel to detect a first set of voxels found inside one or more particles, and a second set of voxels found outside the particles; and means for generating, based on the first set of voxels, a second image from the first image, wherein the compositing and rendering logic is further to render the second image.

Example 32 includes the subject matter of Example 31, further comprising: means for placing the particles in a plurality of bins corresponding to the array of metavoxels; and means for receiving the particles from the plurality of bins, wherein the particles include volume primitives.

Example 33 includes the subject matter of Example 31, further comprising means for selecting the first set of voxels to be included in the second image.

Example 34 includes the subject matter of Example 33, further comprising means for rejecting the second set of voxels from being included in the second image.

Example 35 includes the subject matter of Example 31, further comprising means for compositing the second volume and the first set of voxels in generating the second image from the first image.

Example 36 includes the subject matter of Example 31, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

Example 37 includes the subject matter of Example 31, further comprising means for performing a shadow test on the plurality of metavoxels, wherein the shadow test to determine at least one of a shadowed portion and a non-shadowed portion of each metavoxel, wherein the non-shadowed portion is included in the second image, wherein the shadowed portion is not included in the second image.

Example 38 includes the subject matter of Example 37, further comprising means for performing a depth test on the plurality of metavoxel, wherein the depth test to determine at least one of a depth-passing portion and a depth-failing portion of each metavoxel, wherein the depth passing portion is included in the second image, wherein the depth failing portion is not included in the second image.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a hardware processing device coupled to memory, wherein the hardware processing device to facilitate:
   division and binning logic to divide a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels;
   fill volume logic to apply particles to each metavoxel to detect a first set of voxels found inside one or more particles, and a second set of voxels found outside the particles;
   compositing and rendering logic to generate, based on the first set of voxels, a second image from the first image, wherein the compositing and rendering logic is further to render the second image; and
   shadows computation logic of a computation engine to perform a shadow test on the array of metavoxels, wherein the shadow test to determine at least one of a shadowed portion and a non-shadowed portion of each metavoxel, wherein the non-shadowed portion is included in the second image, and wherein the shadowed portion is not included in the second image.

2. The apparatus of claim 1, wherein the hardware processing device to facilitate the division and binning logic to place the particles in a plurality of bins corresponding to the array of metavoxels, wherein the fill volume logic to receive the particles from the plurality of bins, wherein the particles include volume primitives.

3. The apparatus of claim 1, wherein the hardware processing device to facilitate the fill volume logic to select the first set of voxels to be included in the second image.

4. The apparatus of claim 3, wherein the hardware processing device to facilitate the fill volume logic to reject the second set of voxels from being included in the second image.

5. The apparatus of claim 1, wherein the hardware processing device to facilitate the compositing and rendering logic to composite the second volume and the first set of voxels in generating the second image from the first image.

6. The apparatus of claim 1, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

7. The apparatus of claim 1, wherein the hardware processing device is further to facilitate depth computation logic of the computation engine to perform a depth test on the array of metavoxels, wherein the depth test to determine at least one of a depth-passing portion and a depth-failing portion of each metavoxel, wherein the depth passing portion is included in the second image, and wherein the depth failing portion is not included in the second image.

8. A method comprising:
dividing a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels;
applying particles to each metavoxel to detect a first set of voxels found inside one or more particles, and a second set of voxels found outside the particles;
generating, based on the first set of voxels, a second image from the first image, wherein the compositing and rendering logic is further to render the second image; and
performing a shadow test on the array of metavoxels, wherein the shadow test to determine at least one of a shadowed portion and a non-shadowed portion of each metavoxel, wherein the non-shadowed portion is included in the second image, and wherein the shadowed portion is not included in the second image.

9. The method of claim 8, further comprising:
placing the particles in a plurality of bins corresponding to the array of metavoxels; and
receiving the particles from the plurality of bins, wherein the particles include volume primitives.

10. The method of claim 8, further comprising selecting the first set of voxels to be included in the second image.

11. The method of claim 10, further comprising rejecting the second set of voxels from being included in the second image.

12. The method of claim 8, further comprising compositing the second volume and the first set of voxels in generating the second image from the first image.

13. The method of claim 8, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

14. The method of claim 8, further comprising performing a depth test on the array of metavoxels, wherein the depth test to determine at least one of a depth-passing portion and a depth-failing portion of each metavoxel, wherein the depth passing portion is included in the second image, and wherein the depth failing portion is not included in the second image.

15. At least one non-transitory machine-readable medium comprising a plurality of instructions, executed on a computing device, to facilitate the computing device to perform one or more operations comprising:
dividing a volume of a first image into a first volume and a second volume, wherein the first volume is associated with a fuzzy portion of the image, and the second volume is associated with a non-fuzzy portion of the image, wherein the first volume includes an array of metavoxels, wherein a metavoxel includes an array of voxels;
applying particles to each metavoxel to detect a first set of voxels found inside one or more particles, and a second set of voxels found outside the particles;
generating, based on the first set of voxels, a second image from the first image, wherein the compositing and rendering logic is further to render the second image; and
performing a shadow test on the array of metavoxels, wherein the shadow test to determine at least one of a shadowed portion and a non-shadowed portion of each metavoxel, wherein the non-shadowed portion is included in the second image, and wherein the shadowed portion is not included in the second image.

16. The non-transitory machine-readable medium of claim 15, wherein the one or more operations further comprise:
placing the particles in a plurality of bins corresponding to the array of metavoxels; and
receiving the particles from the plurality of bins, wherein the particles include volume primitives.

17. The non-transitory machine-readable medium of claim 15, wherein the one or more operations further comprise selecting the first set of voxels to be included in the second image.

18. The non-transitory machine-readable medium of claim 17, wherein the one or more operations further comprise rejecting the second set of voxels from being included in the second image.

19. The non-transitory machine-readable medium of claim 15, wherein the one or more operations further comprise compositing the second volume and the first set of voxels in generating the second image from the first image.

20. The non-transitory machine-readable medium of claim 15, wherein rendering includes displaying the second image comprising the non-fuzzy portion associated with the second volume, and a first section of the fuzzy portion associated with the first set of voxels, wherein a second section of the fuzzy portion associated with the second set of voxels is not rendered.

21. The non-transitory machine-readable medium of claim 17, further comprising performing a depth test on the array of metavoxels, wherein the depth test to determine at least one of a depth-passing portion and a depth-failing portion of each metavoxel, wherein the depth passing portion is included in the second image, and wherein the depth failing portion is not included in the second image.

* * * * *